(12) United States Patent
Hewavithana et al.

(10) Patent No.: US 10,491,249 B2
(45) Date of Patent: Nov. 26, 2019

(54) METHOD AND APPARATUS FOR SELF-INTERFERENCE CANCELATION IN A FULL DUPLEX NETWORK

(71) Applicant: Intel Corporation, Santa Clara, CA (US)

(72) Inventors: Thushara Hewavithana, Hatfield (GB); Shaul Shulman, Ramat Gan (IL); Noam Tal, Givataim (IL); Boaz Kol, Hod-Hasharon (IL); Nathan Goichberg, Ashdod (IL); David Barr, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/978,213

(22) Filed: May 14, 2018

(65) Prior Publication Data
US 2019/0044555 A1 Feb. 7, 2019

Related U.S. Application Data

(60) Provisional application No. 62/574,760, filed on Oct. 20, 2017.

(51) Int. Cl.
| H04B 1/04 | (2006.01) |
| H04B 3/20 | (2006.01) |
| H04L 12/28 | (2006.01) |
| H04L 5/14 | (2006.01) |
| H04L 27/26 | (2006.01) |

(52) U.S. Cl.
CPC ............. *H04B 1/0475* (2013.01); *H04B 3/20* (2013.01); *H04L 5/14* (2013.01); *H04L 12/2801* (2013.01); *H04L 27/2628* (2013.01); *H04L 27/2647* (2013.01)

(58) Field of Classification Search
CPC ............................. H04L 5/1461; H04B 1/525
USPC ............. 379/406.06, 406.08, 406.12, 406.14
See application file for complete search history.

(56) References Cited

U.S. PATENT DOCUMENTS 6,147,979 A * 11/2000 Michel ................ H04M 9/082
370/286

* cited by examiner

*Primary Examiner* — Kevin Kim
(74) *Attorney, Agent, or Firm* — 2SPL Patent Attorneys

(57) ABSTRACT

A method and apparatus for cancelling self-interference in a cable network implementing full duplex (FDX). A processor in a cable modem may obtain a frequency response of an echo channel for at least one sub-channel in an FDX band and calculate filter coefficients based on the frequency response, and an interference canceller cancels the self-interference in the downstream signal. The interference canceller includes filters in a digital domain to generate an interference cancellation signal from a reference signal. In another example, the processor may obtain frequency responses of an echo channel for all sub-channels in a FDX band, combine the frequency responses for the FDX band, and generate a channel impulse response for the FDX band from the combined frequency response. The interference canceller may then cancel the self-interference in the downstream signal in an analog domain based on the channel impulse response.

23 Claims, 17 Drawing Sheets

METHOD AND APPARATUS FOR SELF-INTERFERENCE CANCELATION IN A FULL DUPLEX NETWORK

CROSS REFERENCE TO RELATED APPLICATIONS

This application claims priority under 35 U.S.C. § 119(e) to U.S. provisional application No. 62/574,760, entitled "Echo Cancellation System with Frequency Domain Echo Channel Training for Synchronized and Unsynchronized Training Signal" and filed Oct. 20, 2017, which is incorporated by reference as if fully set forth herein.

FIELD

Examples relate to a method and apparatus for interference cancellation. More particularly, examples related to a method and apparatus for cancelling self-interference in a cable network implementing full duplex (FDX).

BACKGROUND

FIG. 1 shows a conventional Data Over Cable Service Interface Specification (DOC SIS) network. The cable modem (CM) 110 connects to the operator's hybrid fiber coax (HFC) network 140 and to a home network, bridging packets between them. Customer premise equipments (CPEs) 130 are connected to a cable modem 110. A CPE 130 may be embedded in the cable modem 110 in a single device or they may be separate. Examples of a CPE 130 include a gateway, a home router, a set-top box (STB), a personal computer, etc. The cable modem termination system (CMTS) 120 connects the operator's back office and core network to the HFC network 140. The CMTS 120 forwards packets between these two domains and between upstream and downstream channels on the HFC network.

The DOC SIS standards for the next generation HFC technology will be based on FDX. DOCSIS FDX will allow downstream and upstream transmissions to use the same radio frequency (RF) spectrum at the same time to increase the spectral efficiency in a cable network. As the downstream and upstream spectrums overlap in time and frequency in FDX, interference would occur between transmissions and receptions.

In order to implement FDX in a cable network, cable modems may be partitioned into interference groups. An interference group is a set of cable modems in which upstream and downstream signals of cable modems interfere with each other. Once interference groups have been identified the head-end (i.e. the CMTS 120) can schedule full duplex upstream and downstream packets to the cable modems so that they do not collide in time and frequency.

While a cable network operates in FDX, a cable modem in the FDX-mode cable network may operate on separate frequency bands for upstream and downstream (i.e. in a frequency division duplex (FDD) mode) to avoid upstream interference to downstream in an FDX band. A cable modem generally does not have dedicated filters or duplexers to protect a downstream channel from the high power upstream transmissions due to the very high cost of such devices and network capacity loss due to guard bands that filters would require.

Although a cable modem operates in FDD, upstream transmit power levels are significantly higher compared to the downstream received power levels. Part of the upstream signals leaks into the downstream data path with the level of isolations available with current components (directional couplers). In addition to that, a cable modem also gets reflections of the upstream signals from the HFC path coming back to the cable modem with considerable power levels.

The upstream self-interference in a cable network has two elements: adjacent channel interference (ACI) due to an in-band high power upstream signal, and adjacent leakage interference (ALI) due to out-of-band leakage of an upstream signal, which may be in-band of a downstream channel. ACI can cause saturation of a downstream analog-to-digital converter (ADC), which would require additional back off and hence losing the ADC dynamic range. On the other hand, ALI directly affects the modulation error ratio (MER) of a downstream channel acting as an in-band interferer. It may be needed to cancel the ALI and the ACI by around 30 dB in order to remove the effects of self-interference on a cable modem. The cable modem needs to deal with high power adjacent channels as well as the leakage from these adjacent channels into the downstream channels.

BRIEF DESCRIPTION OF THE FIGURES

Some examples of apparatuses and/or methods will be described in the following by way of example only, and with reference to the accompanying figures, in which.

DETAILED DESCRIPTION

Figure 1:
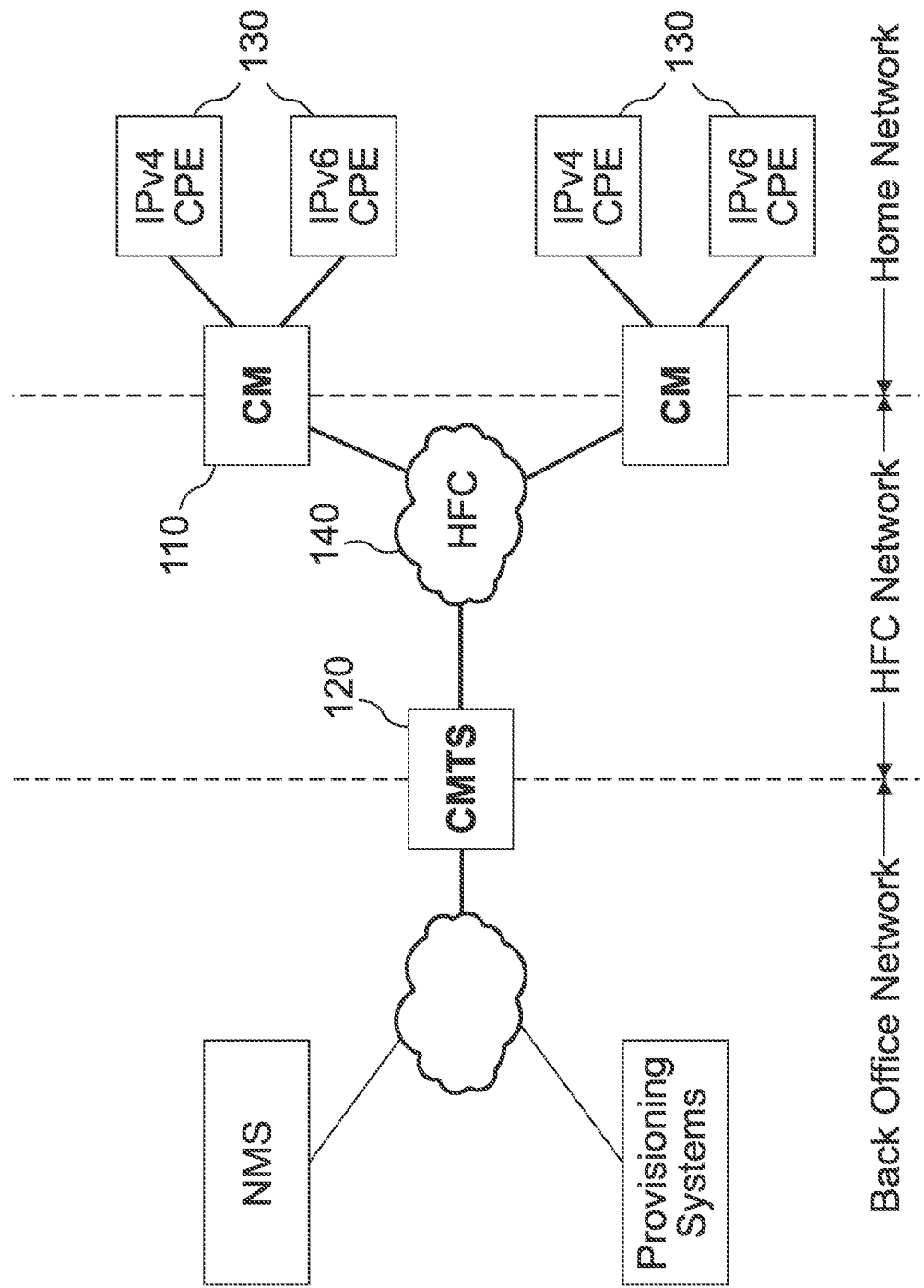
FIG. 1 shows a conventional DOCSIS network.

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled or via one or more intervening elements. If two elements A and B are combined using an "or", this is to be understood to disclose all possible combinations, i.e. only A, only B as well as A and B. An alternative wording for the same combinations is "at least one of A and B". The same applies for combinations of more than 2 elements.

The terminology used herein for the purpose of describing particular examples is not intended to be limiting for further examples. Whenever a singular form such as "a," "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

The examples disclosed herein provide solutions to a problem of separating the strong upstream transmit signal from the weak downstream receive signal in a cable modem. This feature is needed for a new standard for HFC networks, e.g. DOCSIS 3.1 FDX, which is based on FDX where the information is transmitted and received on the same frequency at the same time.

In examples, systems and methods are disclosed to significantly reduce the effects of echo and train the echo channel coefficients for ACI and ALI. In some examples, the echo channel training may be performed in the frequency domain, and additional frequency domain filtering may be applied to improve the channel estimate. The examples also provide the ability to use synchronized or unsynchronized training. Synchronized training means that the orthogonal frequency division multiplex (OFDM) symbols of upstream signals and downstream signals are aligned, and unsynchronized training means that they are not. With the unsynchronized training, a cable modem may use the normal upstream transmissions for training and not just the special training opportunities, which will allow better tracking of the echo response or decrease the number of needed training opportunities. This can reduce the load on the network and increase the throughput.

In some examples, a cable modem may perform echo cancellation using a full bandwidth analog echo canceller. The analog echo canceller may cancel the upstream echo from the entire FDX band i.e. full band echo cancellation instead of echo cancellation per channel. In the examples, a cable modem may combine the per-channel channel coefficients and process the combined channel coefficients to derive echo canceller coefficients for the full bandwidth echo canceller.

The examples for the interference (i.e. echo) cancellation will be explained with reference to a cable modem operating in a DOSCIS standards-based cable network. However, it should be noted that the examples may also be implemented in a CMTS or any other devices in a DOCSIS network or any other types of networks.

Time domain echo cancellation techniques, which involve convolution with a channel impulse response, are more complicated than frequency domain echo cancellation techniques since in a frequency domain each subcarrier may be handled independently. In addition, for the training methods described in the DOCSIS FDX specifications it is needed to remove the known subcarriers of the downstream signal so only the interference remains. This is much more difficult in time domain methods. Furthermore, in a frequency domain method, complexity increases fractionally with the increase in length of the echo channel impulse response (requiring the same increase in overlap between data blocks), provided that the data block length is large compared to the length of the channel impulse response. On the other hand, in a time domain method, complexity is directly proportional to the echo channel length.

Figure 2:
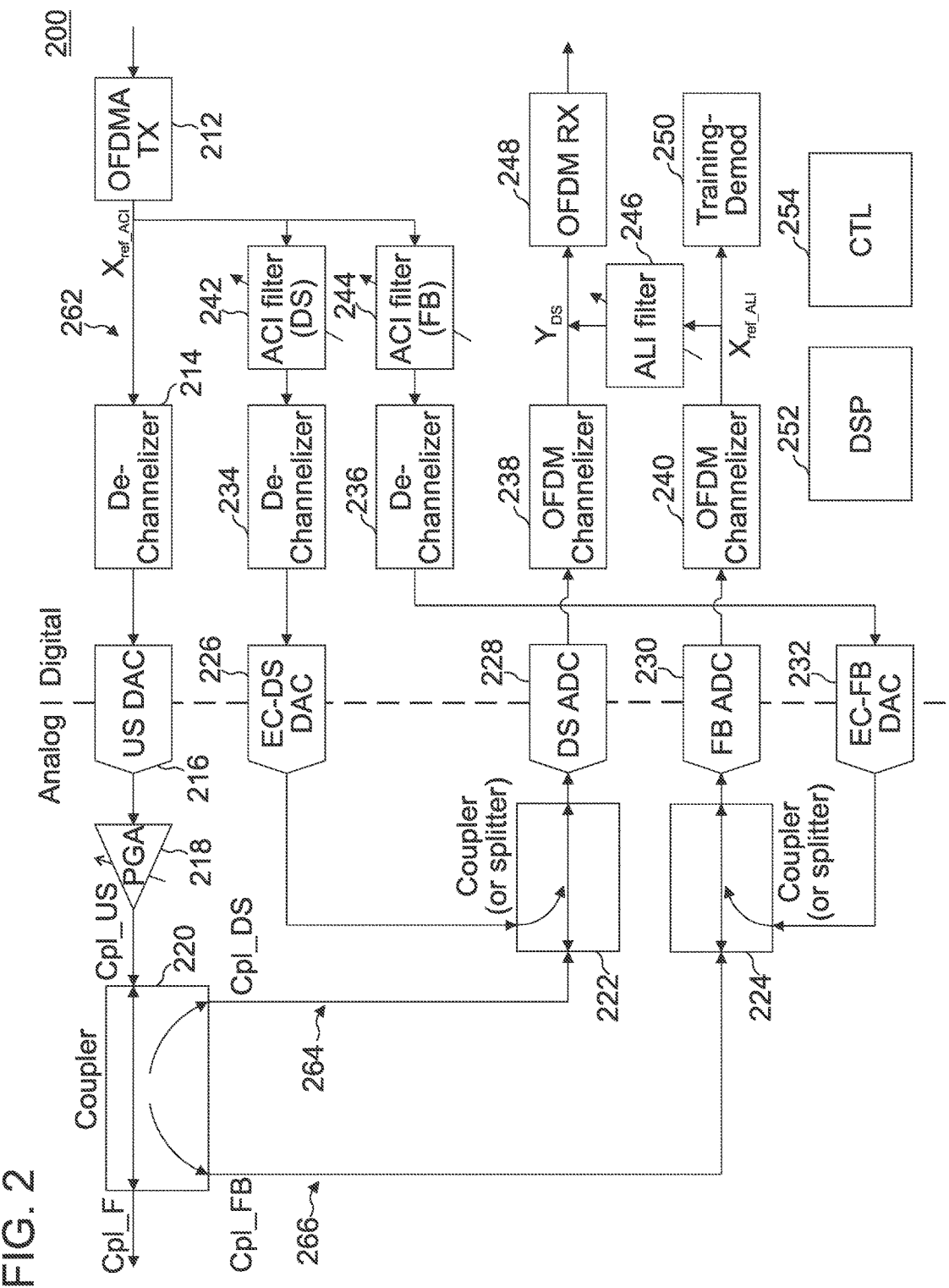
FIG. 2 is an example architecture of a cable modem with an echo cancellation system.

FIG. 2 is an example architecture of a cable modem 200 with an echo cancellation system. The cable modem 200 includes digital-to-analog converters (DACs) and analog-to-digital converters (ADCs) for upstream (US) transmission and downstream (DS) reception, respectively. The US DAC 216 on the upstream path 262 is for upstream transmission, and the DS ADC 228 on the downstream path 264 is for downstream reception. The cable modem 200 also includes auxiliary transmit and receive paths to subtract the self-interfering transmit signal (i.e. ACI and ALI) from the received signal. The EC-DS DAC 226 and EC-FB DAC 232 are used for ACI cancellation in an analog domain on the downstream path 264 and the feedback path 266, respectively. The FB ADC 230 on the feedback path 266 is used for ALI cancellation and echo channel training.

The orthogonal frequency division multiple access (OFDMA) 212 transmitter is an upstream transmitter for modulating the upstream data to be transmitted by the cable modem. Filtering, rate conversion, and the like may be performed on the modulated upstream transmit data by the de-channelizer 214. The de-channelizer 214 up-samples and multiplexes individual upstream channels with appropriate frequency shifts into a single higher sample rate upstream signal. The modulated upstream data is then converted to an analog signal by the DAC 216. A programmable gain amplifier (PGA) 218 is used to amplify the upstream signal for transmission. A coupler 220 couples the upstream signal to the cable modem output (e.g. an F-connector). The coupler 220 also connects the cable modem input (e.g. the F-connector) to the downstream path 264. A fraction of the upstream signal is tapped to the feedback path 266 at the coupler 220. The feedback path 266 is provided to subtract the self-interfering signal (the echo of the upstream signal) from the received signal. Additional couplers (or splitters) 222, 224 may be used to perform the analog cancelation of the ACI on the downstream path 264 and/or on the feedback path 266, respectively. Channelizers 238, 240 and de-channelizers 214, 234, 236 are used to perform filtering and rate conversion (decimation and interpolation) from the ADCs 228, 230 to the OFDM receiver 248 and the training demodulator 250 or from the OFDMA transmitter 212 to the DACs 216, 226, 232.

The received downstream signal is coupled to the downstream path 264 via the coupler 220. ACI may be cancelled from the downstream signal at the coupler 222 in an analog domain. The ACI reference signal is filtered by the ACI filter 242, and then de-channelized by the de-channelizer 234, and then converted to an analog signal by the DAC 226 and then added (or subtracted) from the received downstream signal at the coupler 222 for ACI cancellation. The downstream signal after ACI cancellation is then converted to a digital signal by the ADC 228. The OFDM channelizer 238 may perform filtering and/or rate conversion on the digital signal to extract a specific frequency band of signal. The OFDM receiver 248 is the downstream receiver (i.e. demodulator) for demodulating the received signal. The OFDM receiver 248 is also used for echo channel training.

The upstream transmitted signal is tapped to the feedback path 266 at the coupler 220. ACI may be cancelled from the feedback signal at the coupler 224 in an analog domain. The ACI reference signal is filtered by the ACI filter 244, and then de-channelized by the de-channelizer 236, and then converted to an analog signal by the DAC 232 and then added (or subtracted) from the feedback signal at the coupler 224 for ACI cancellation. The feedback signal after ACI cancellation is converted to a digital signal by the ADC 230. The OFDM channelizer 240 may perform filtering and/or rate conversion to extract a specific frequency band of signal. The training demodulator 250 is a partial OFDM receiver used for training the echo channel.

The ACI filters 242, 244 are filters used for cancelling ACI on the downstream path 264 and the feedback path 266. One filter 242 may be used for canceling the ACI on the downstream path 264 and another filter 244 may be used for canceling the ACI on the feedback path 266. There may be one ACI filter per upstream channel. The ACI filter coefficients are the trained echo channel response for ACI. The ACI filters 242, 244 use the $X_{ref\_ACI}$ signal (e.g. the transmit upstream signal in a frequency domain) as input and the output from the ACI filters are converted to analog signals by the DACs 226, 232 for ACI cancellation at the couplers 222, 224, respectively, in an analog domain.

The ALI filter 246 is a filter for canceling the ALI on the downstream path 264. There may be one ALI filter per downstream channel. The ALI filter coefficients are the trained echo channel response for ALI. In one example, the ALI filter 246 may take $X_{ref\_ALI}$ (e.g. the feedback path signal taken at the output of the channelizer 240) as input and the output of the ALI filter 246 is added (or subtracted) from the downstream channelized signal $Y_{DS}$. In this example, the ALI cancelation is performed in a digital domain.

The digital signal processor (DSP) 252 and the controller (CTL) 254 perform echo channel training to calculate the ACI and ALI filter coefficients. The echo channel training is performed to determine echo channel coefficients for ACI and ALI and then these coefficients are used to reduce or cancel the self-interference. The training is supported by the DOCSIS FDX standard. The cable modem may use proprietary training signals. The training may be performed by the cable modem by transmitting a training signal on the upstream and measuring it on the downstream that includes the interference from the training signal. The training signal is used as reference to extract the echo channel response. Calculation of ACI and ALI filter coefficients will be explained below. Both the ACI filters 242, 244 and the ALI filter 246 may be implemented as time domain filters or digital domain filters. If implemented as time domain filters, their length might be very long and the cost might be high (e.g. 100s of taps). A simpler implementation would be to use an overlap and add method and perform the filtering in a frequency domain.

The cable modem 200 performs training for estimating the echo channel coefficients. Training may be performed during training periods. During the training period, a special training signal may be transmitted by the cable modem (i.e. the OFDMA transmitter 212) and the echo channel coefficients may be estimated based on the training signal. The training signal is a known signal and may be aligned to the downstream OFDM symbol. Alternatively, training may be performed during normal upstream transmissions. In this case, no special training signal may be needed.

In some examples, the cable modem 200 may perform the echo channel training in a frequency domain. For ALI filter coefficients calculation, the received sample per predetermined subcarrier (e.g. scatted pilot (SP) subcarriers, zero-bit loaded (ZBL) subcarriers, or the like) can be expressed as follows:

$$y = X_{DS} \cdot H_{DS} + X_{ref} \cdot H_{ec} + n, \quad \text{Equation (1)}$$

where $X_{DS}$ is the known values (e.g. pilot symbols), $H_{DS}$ is the estimated downstream channel frequency response for the predetermined subcarrier, $X_{ref}$ is the signal coming from the feedback path ($X_{ref\_ALI}$), $H_{ec}$ is the echo channel frequency response for the predetermined subcarrier, and n is a noise.

Since the downstream signal level would be higher than the ALI level, the downstream part in Equation (1) may be subtracted as follows:

$$\tilde{y} = y - X_{DS} \cdot H_{DS} = X_{ref} \cdot H_{ec} + n. \quad \text{Equation (2)}$$

The echo channel frequency response for ALI may be estimated over multiple symbols using, for example, a least square method, as follows:

$$\hat{H}_{ec} = \frac{\sum_i X_{ref}^*(i) \cdot y(i)}{\sum_i |X_{ref}(i)|^2}. \quad \text{Equation (3)}$$

The echo channel delay spread of the dominant echoes may be relatively small (up to ~1 μs). This fact may be exploited to do additional filtering of the noise. The filtering may be performed in several different ways. In one example, the filtering may be performed in a frequency domain. A filter with a desired time length (e.g. 1 μs) may be used to filter the frequency domain channel response. This filtering may be implemented using multiple decimation stages to reduce the implementation complexity.

Figure 3:
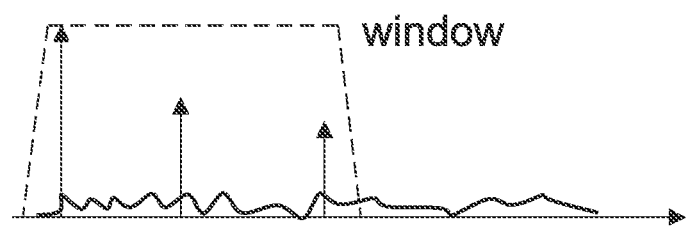
FIG. 3 shows an example window applied to a time domain channel response.

Alternatively, time domain windowing may be used. The calculated frequency response may be converted to a time domain using inverse discrete Fourier transform (IDFT), efficiently implemented using inverse fast Fourier transform (IFFT), and a window may be applied to the impulse response in a time domain. For example, the window may be a rectangular window with linear tapering as shown in FIG. 3, a Tukey window, or any other window with a flat top to cover the impulses. Discrete Fourier transform (DFT)/fast Fourier transform (FFT) is then applied to the windowed impulse response to convert back to a frequency domain.

Figure 4:
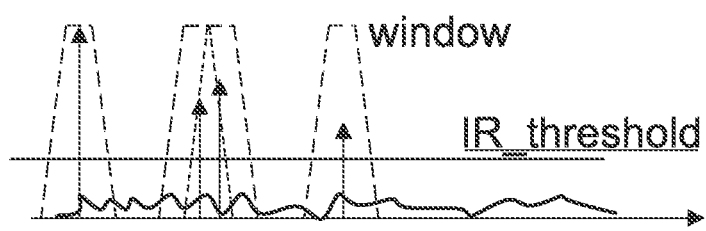
FIG. 4 shows narrow windows placed to cover each impulse in a time domain channel response.

Alternatively, if the echo channel can be characterized by few discrete echoes, a generalized mask may be applied in a time domain to leave only echoes and their immediate neighboring areas. This may give the optimal noise filtering customized to the echo channel impulse response. This is a generalization of the time domain windowing discussed above with a window optimized to the channel impulse response. In order to calculate the window to be applied, locations of significant echoes may be identified by applying a threshold to the impulse response (IR) as shown in FIG. 4. One or more narrow windows may be placed to cover each impulse as shown in FIG. 4. If two or more of the windows overlap due to echoes with close proximity in time of echoes, those windows may be combined to form a single wider window (e.g. the middle window shown in FIG. 4).

The training and echo cancellation process for ACI is similar to the process for ALI with some changes. Two ACI cancellers may be used. A first ACI canceller may cancel ACI on the main downstream path 264. A second ACI canceller may cancel ACI on the feedback path 266, which may be done to reduce the requirements of the ADC 230 (FB-ADC) on the feedback path 266. The ACI echo response in the feedback path 266 is mainly internal to the cable modem 200 since the isolation in the coupler 220 from the F-connector to the feedback port is very high. In some examples, the echo channel for the feedback path 266 to the ADC 230 (FB-ADC) may be pre-calibrated, instead of trained.

For calculation of the ACI filter coefficients, the downstream receive signal may not be subtracted since the interference level would be higher than the downstream signal and the downstream signal may be considered as part of the noise. The signal seen in the downstream path 264 in a frequency domain per subcarrier may be expressed as follows:

$$y = X_{ref} \cdot H_{ec} - X_{ref} \cdot \hat{H}_{ec\text{-}ACI} \cdot H_{ACI\text{-}canceler} + (n + X_{DS} \cdot H_{DS}),$$ Equation (4)

where $X_{ref}$ is the reference transmit signal ($X_{ref\_ACI}$) on the transmit path 262, $H_{ec}$ is the echo channel frequency response for the predetermined subcarrier, $\hat{H}_{ec\text{-}ACI}$ is the estimated ACI echo channel (in the ACI filter) and $H_{ACI\text{-}canceler}$ is the channel response from the output of the ACI filter 242 to the input of the OFDM receiver 248 including the analog part after the DAC 226 and the coupler 222. The channel response $H_{ACI\text{-}canceler}$ may be calibrated or trained. After $H_{ACI\text{-}canceler}$ is determined, it may be removed from the estimation for the ACI filter as follows:

$$\hat{H}_{ec\text{-}ACI} = \hat{H}_{ec}/H_{ACI\text{-}canceler}.$$ Equation (5)

The process of calculating echo channel response needed to program ACI filter may be as follows. $H_{ACI\text{-}canceler}$ may be estimated as part of factory calibration. This is not dependent on echo channel but on the cable modem hardware. Any changes due to temperature or aging of hardware components may have to be re-calibrated or tracked. The echo channel, $H_{ec}$, may be estimated during the echo channel estimation using the training signaling opportunities defined in DOCSIS FDX specification. This may involve sending a training signal, $X_{ref}$ in upstream and use this as a reference signal to estimate the echo channel using the observed signal, y, at downstream path of the cable modem. The Frequency response, $\hat{H}_{ec\text{-}ACI}$, needed to program ACI filter may be calculated using Equation (5) above.

The coefficients for the ACI filter 244 for the feedback path 266 may be calculated in a similar way.

For the case where the downstream OFDM symbol is not aligned with the upstream OFDM symbol, if the same frequency domain estimation is used, a bias may be caused in the channel estimation. Even without correcting for the bias, the channel estimation performance may be as accurate as −35 dB. This bias may be corrected and the accuracy may be improved by applying an amplitude correction (a gain correction) to the estimated impulse response. The amplitude correction may be as follows:

$$\hat{\hat{h}}_n = \frac{N_{fft}}{N_{fft} - n} \cdot \hat{h}_n,$$ Equation (6)

where $N_{fft}$ is the size of the downstream DFT/FFT, h is the time domain channel impulse response, and n is an index. The Equation (6) scales the time domain taps to correct for the energy of the non-periodic part of the signal related to the non-synchronization of the OFDM symbols. Linear convolution is not equivalent to cyclic convolution because the upstream signal is not triggered within the cyclic-prefix. After this scaling the accuracy of the estimation may be improved by ~10 dB if the OFDM symbols are misaligned by a large enough time. However, if the OFDM symbols are not misaligned by a large enough time, this scaling may cause reduced performance. In some examples, the cable modem (the controller) may determine the size of the OFDM symbol misalignment and decide whether or not to apply this scaling based on the size of the OFDM symbol misalignment (e.g. a cyclic prefix (CP) length).

For ALI training, zero-bit-loaded (ZBL) symbols on the downstream signal may be used. Since the downstream signal may be subtracted for the ALI training, in case of using ZBL symbols (which go over the entire OFDM symbol) for channel estimation, a full-sized DFT may be used to get all the subcarriers. Instead of using the ZBL symbols, scattered pilots (SPs) may be used for training. SPs occur once every 128 subcarriers in each OFDM symbol. Therefore, a partial DFT of size $N_{fft}/128=32$ or 64 may be applied on the feedback path. The SPs are shifted by 1 or 2 subcarriers each OFDM symbol, so for each OFDM symbol a rotation of 1 or 2 subcarrier spacing is needed in the time-domain before applying the DFT. This smaller size DFT may be used for background training since it would not be too costly to duplicate it for all downstream channels. The full-sized DFT may be used just for the number of channels required.

Figures 1, 5:
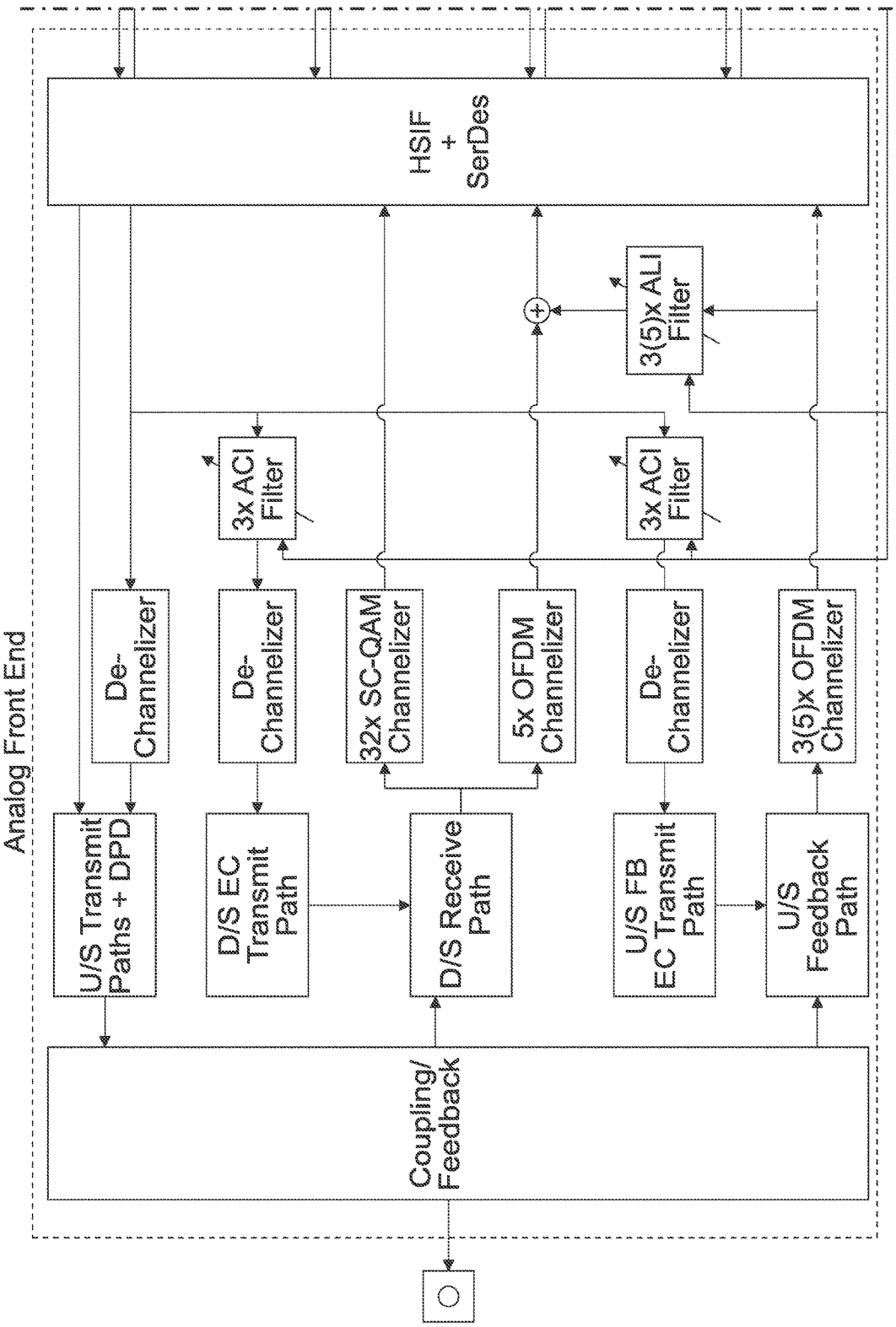
FIGS. 5-7 show several examples for system implementation of a cable modem using a separate analog front end (AFE) chip.
Figures 2, 5:
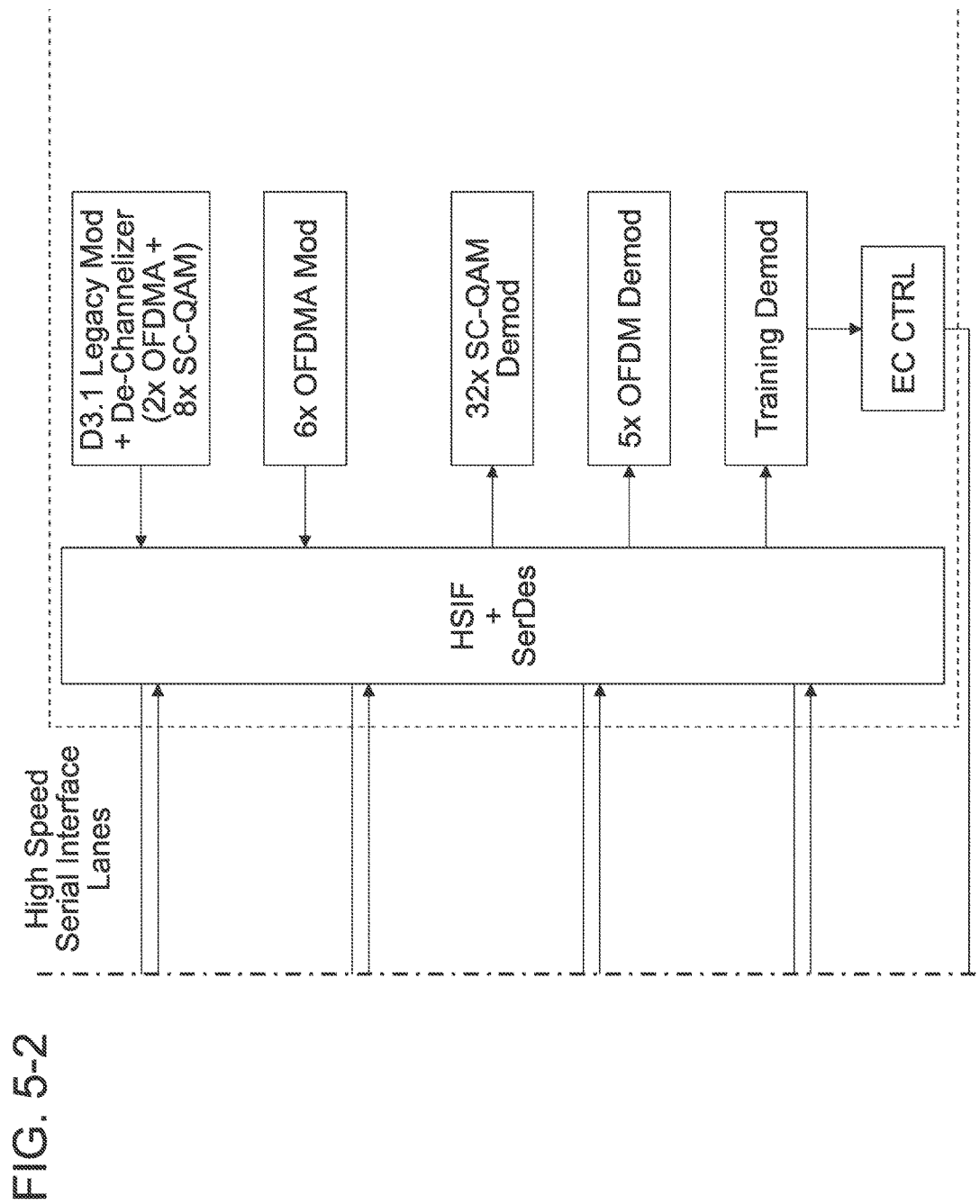
Figures 1, 6:
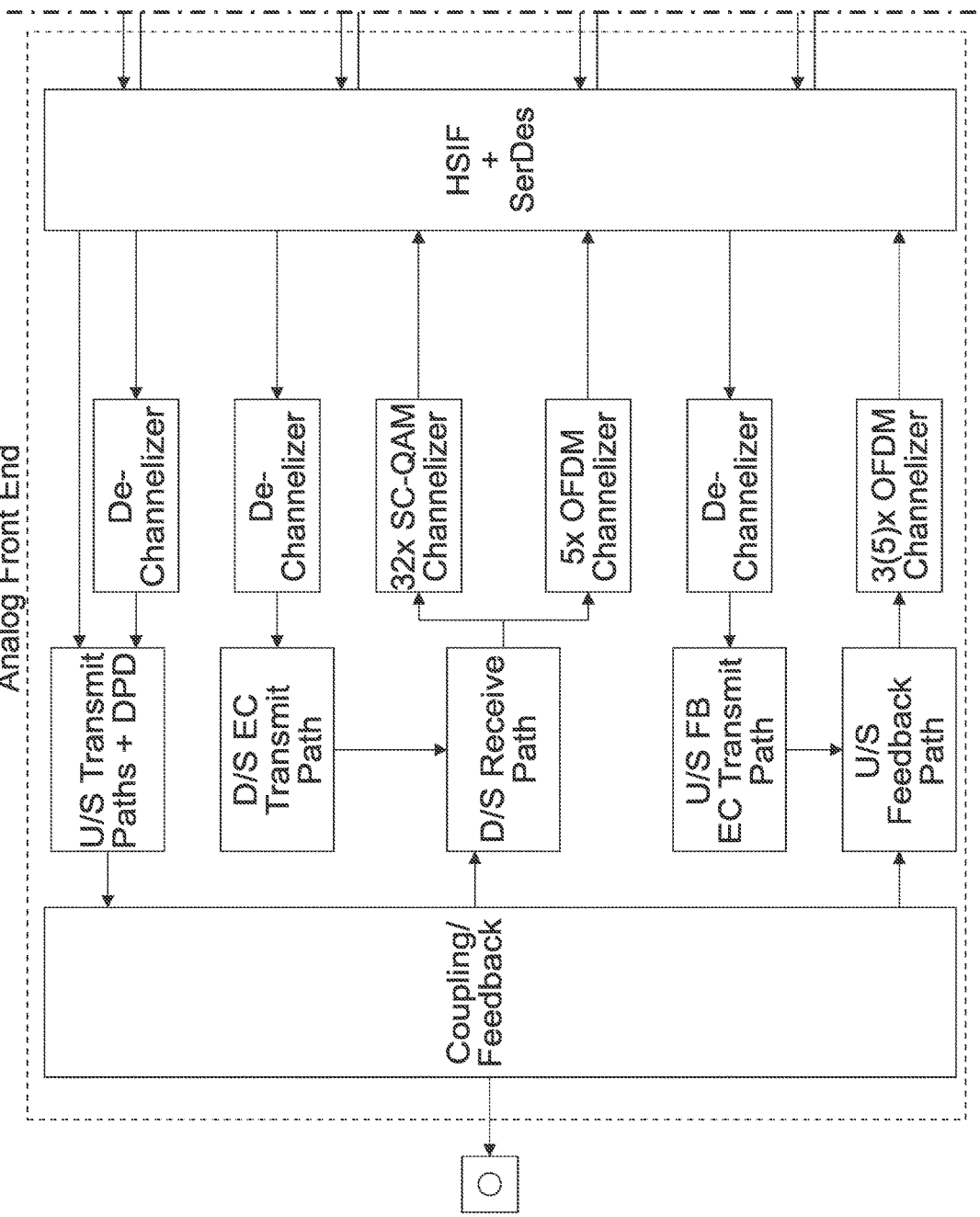
Figures 2, 6:
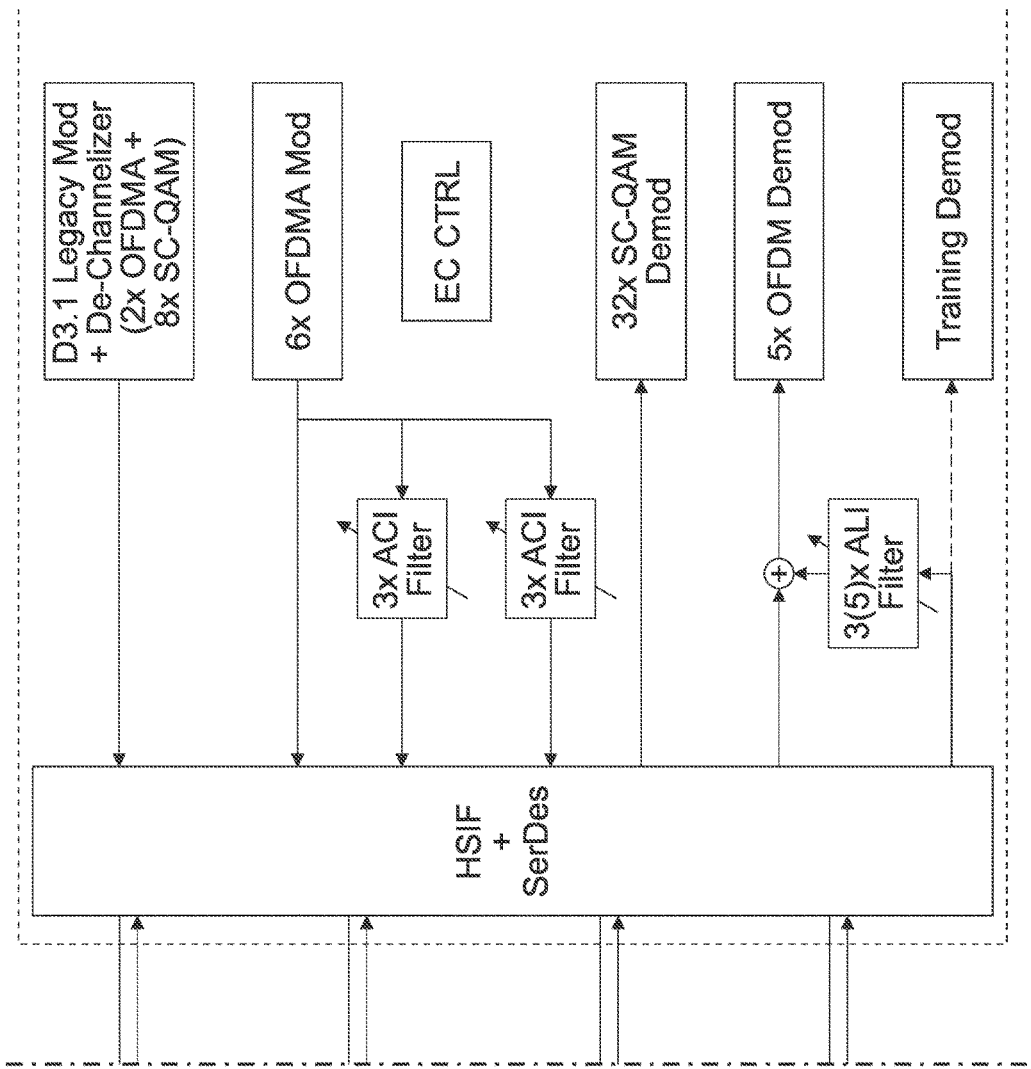
Figures 1, 7:
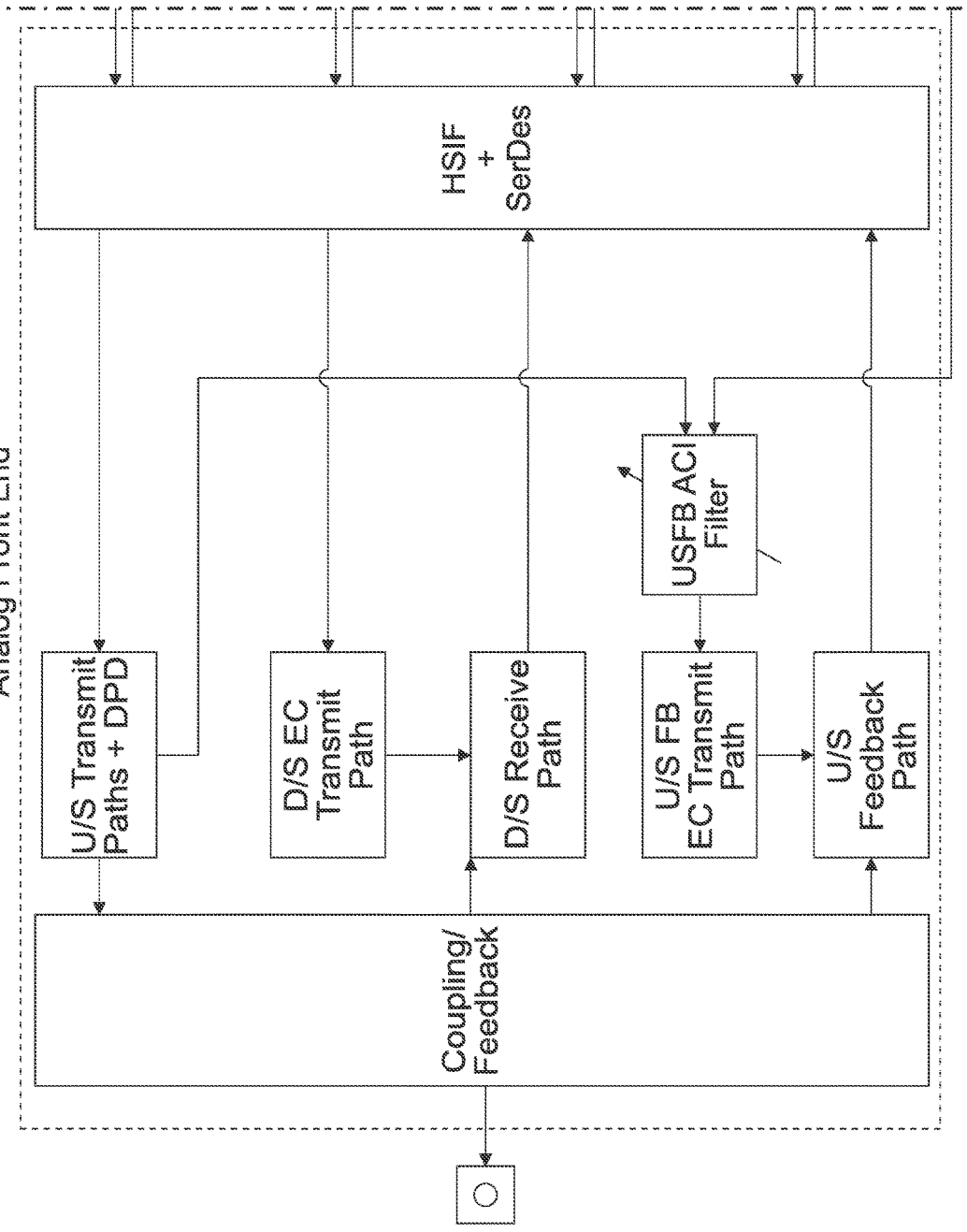
Figures 2, 7:
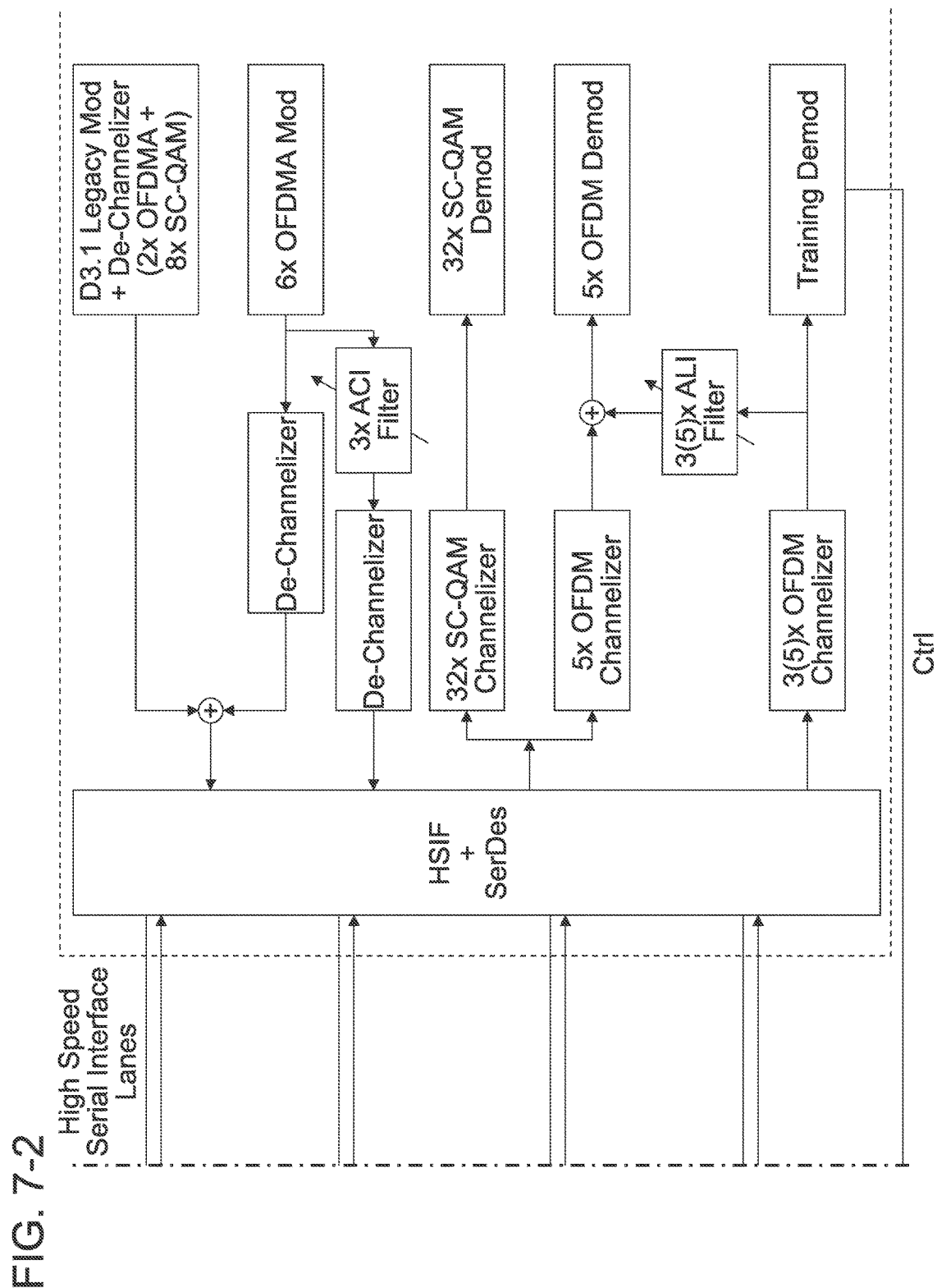

FIGS. 5-7 show several examples for system implementation of a cable modem using a separate analog front end (AFE) chip. FIGS. 5-7 show different partitioning examples of the system including the echo canceller. Different components of the cable modem may be implemented on different chips with a high speed interface connecting the chips. Alternatively, some or all of the components may be integrated into one (or more) chip.

As discussed above, the FDX cable modem needs to cancel echo (self-interference) in downstream channels due to an FDX upstream channel. The DOCSIS standards currently being developed in Cable Labs includes provisions to do self-interference cancellation due to high power adjacent upstream channels. The echo cancellation may be performed such that the echo cancellers are trained per channel and the echo cancellation is performed on a per-channel basis. In that case, the coefficients for ACI and ALI cancellation are computed independently.

In examples disclosed below the echo cancellation may be performed in one step with a full bandwidth echo canceller. An analog echo canceller may be used to cancel the upstream echo from the entire FDX band, which will be referred to as "full band echo cancellation."

Figure 8:
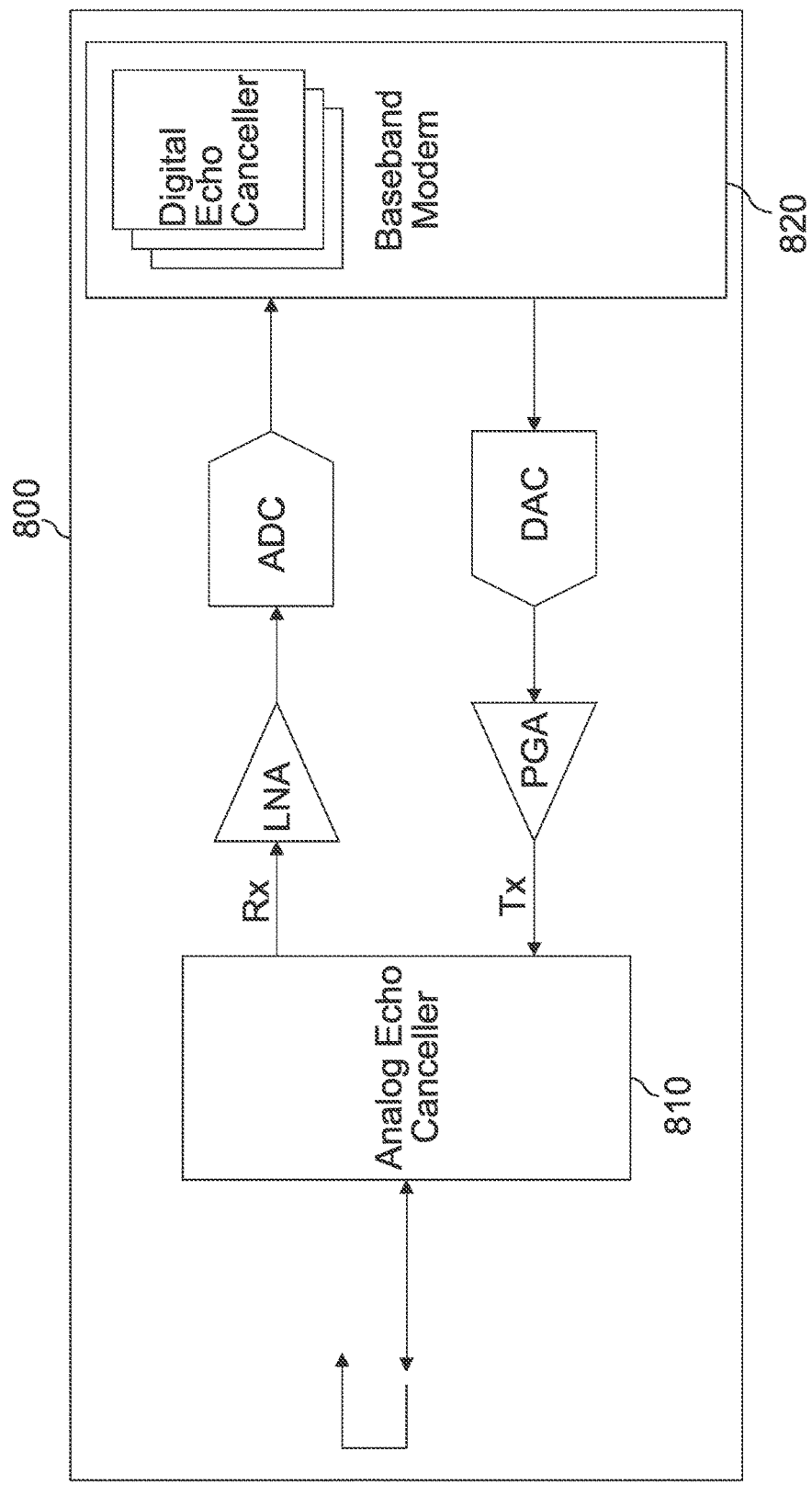
FIG. 8 is a block diagram of an example cable modem with a full band analog echo canceller.

FIG. 8 is a block diagram of an example cable modem with a full band analog echo canceller. In examples, the cable modem 800 may include an analog echo canceller 810 and a baseband modem 820. With the analog echo canceller 810 (including an analog delay line hardware), the cable modem 800 may meet the DOCSIS FDX echo cancellation requirements by analog echo cancellation. The echo cancellation and echo channel training for the full bandwidth of the FDX band is performed using an analog echo canceller. In examples, the echo channel training algorithm may work with per sub-band channel estimates and combine them to get an echo channel impulse response for the entire FDX band for programming the analog echo canceller. Examples for combining the individual channel estimates for different sub-bands to a single wideband channel estimation will be explained below.

In some examples, no digital cancellation may be performed and the interference may be cancelled by an analog echo canceller in an analog domain. Alternatively, the cable modem 800 may also include a digital echo canceller(s) 830 and in addition to the analog domain echo cancellation, the cable modem 800 may further implement the echo cancellation in a digital domain. Combined with the digital echo canceller 830 (per channel), the cable modem 800 may achieve full duplex in a fiber-to-the-tap (FTTT) HFC network where the cable head end and the cable modem are connected using peer-to-peer (P2P) topology. In this case, there may be one cable modem per connection from the cable head end and a full-blown full duplex may be implemented with co-channel upstream interference cancellation. In this case, the transmit power levels would be lower, given that the cable head end and the cable modem are physically closer.

The full band analog echo cancellation potentially removes the ADC and DAC noise floors associated with the per-channel echo cancellers. This is because there is no ADCs and DACs in the full band analog echo cancellation data path. The analog echo canceller may lead to a much simpler and efficient architecture of the cable modem and may reduce cost, area, and power due to simple architecture. The architecture shown in FIG. 8 provides scalability to much larger (e.g. multi-GHz) bandwidths. Depending on the implementation of the analog delay line, multiple channels may be covered with one unit of analog echo canceller.

In the example shown in FIG. 2, the high power upstream signal, which acts as ACI for the downstream channel, is generated in a digital domain, using the ACI filter 242 for ACI cancellation in downstream, and converted to an analog signal using the DAC 226, which is subtracted from the downstream signal. Hence the analog part of echo cancellation is created using the digital processing before converting to analog using the DAC 226. The ACI filter 242 implements the echo channel impulse response for ACI. Leakage from the high power upstream signal, which leaks into the downstream channel (i.e. ALI) is tapped off from the upstream, using a coupler 220, and sampled using an ADC 230 (auxiliary ADC) before using a digital ALI filter 246 to generate a digital copy of echo channel output ALI. The digital ALI filter 246 implements the echo channel impulse response for the ALI signal. In this feedback path, another ACI cancellation DAC 232 (EC-FB DAC) is provided to cancel the ACI (called "auxiliary ACI cancellation") from the feedback path 266 before sampling it for ALI data. In this auxiliary ACI path, the ACI filter 244 (a filter for cancelling ACI on the feedback path 266) implements the channel impulse response of the upstream digital signal to the feedback path for ACI signal. Auxiliary ACI cancellation helps lower the quantization noise floor of the feedback path 266 as DACs generally have larger effective number of bits (ENOB) compared to ADCs (e.g. 10 bits for ADC compared to 12 bits for DAC). Then, this ALI is subtracted from the downstream digital signal per OFDM channel basis. The auxiliary ADC (the ADC 230) in this process also contributes to the demodulation noise floor. All echo cancellation filters are implemented in the channelized domain, per sub-band (i.e. sub-channel).

Figure 9:
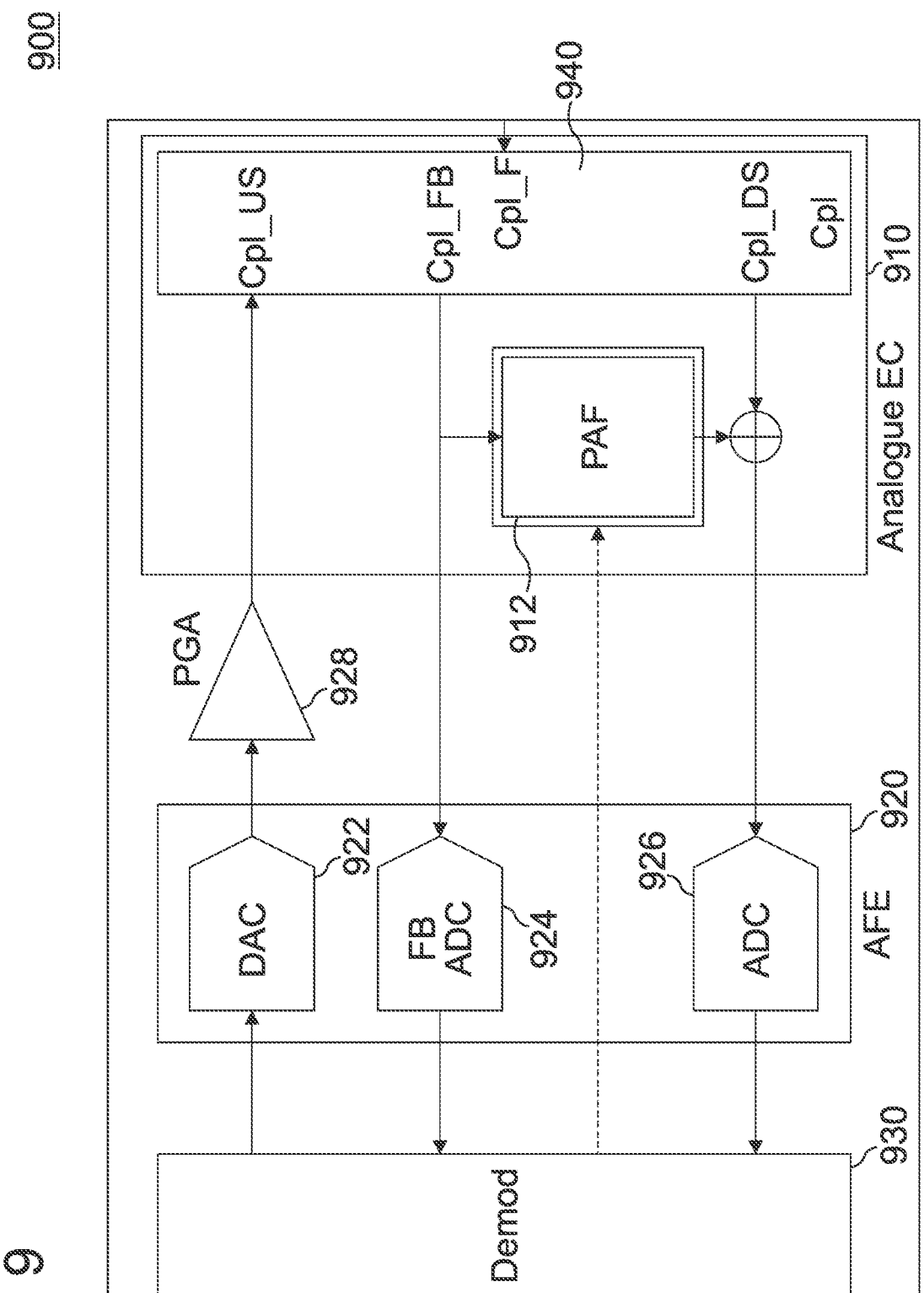
FIG. 9 shows an example structure of a cable modem with an analog echo canceller (a full-band analog echo canceller)

FIG. 9 shows an example structure of a cable modem 900 with an analog echo canceller 910 (a full-band analog echo canceller). The cable modem 900 may include an analog echo canceller 910, an analog front end 920, and a demodulator 930. The analog echo canceller 910 includes a programmable analog filter (PAF) 912 which includes a tunable analog delay line. For example, the PAF 912 may be an analog finite impulse response (FIR) filter with tunable tap delays and signed amplitudes. The PAF 912 is an implementation of analog delay lines that may control delays as well as amplitudes of an analog signal. The PAF 912 is an RF delay line and there are no phase elements involved. The analog front end 920 includes ADCs 924, 926 and a DAC 922. The demodulator 930 takes the downstream sampled signals from the ADC 926 and sends the upstream samples to the DAC 922. The output of the DAC 922 goes through a programmable gain amplifier (PGA) 928 before connecting to the coupler 940. The ADC 924 (feedback ADC) taps out small amount of power from the upstream signal at the coupler 940 placed at the front of the analog echo canceller 910. The coupler 940 may have 4 ports, a downstream port (Cpl_DS) that connects to the downstream signal, an upstream port (Cpl_US) that connects to the upstream signal, a feedback port (Cop_FB) that feeds back a copy of the upstream signal via the ADC 924 to the demodulator 930 to provide data for echo channel training, and an F port (Cpl_F) that connects the cable modem to the external cable. The signal tapped out from the upstream to the feedback path is filtered by the PAF 912 using the coefficients determined based on the full bandwidth channel impulse response and subtracted from the received signal for echo cancellation in an analog domain.

Figure 10:
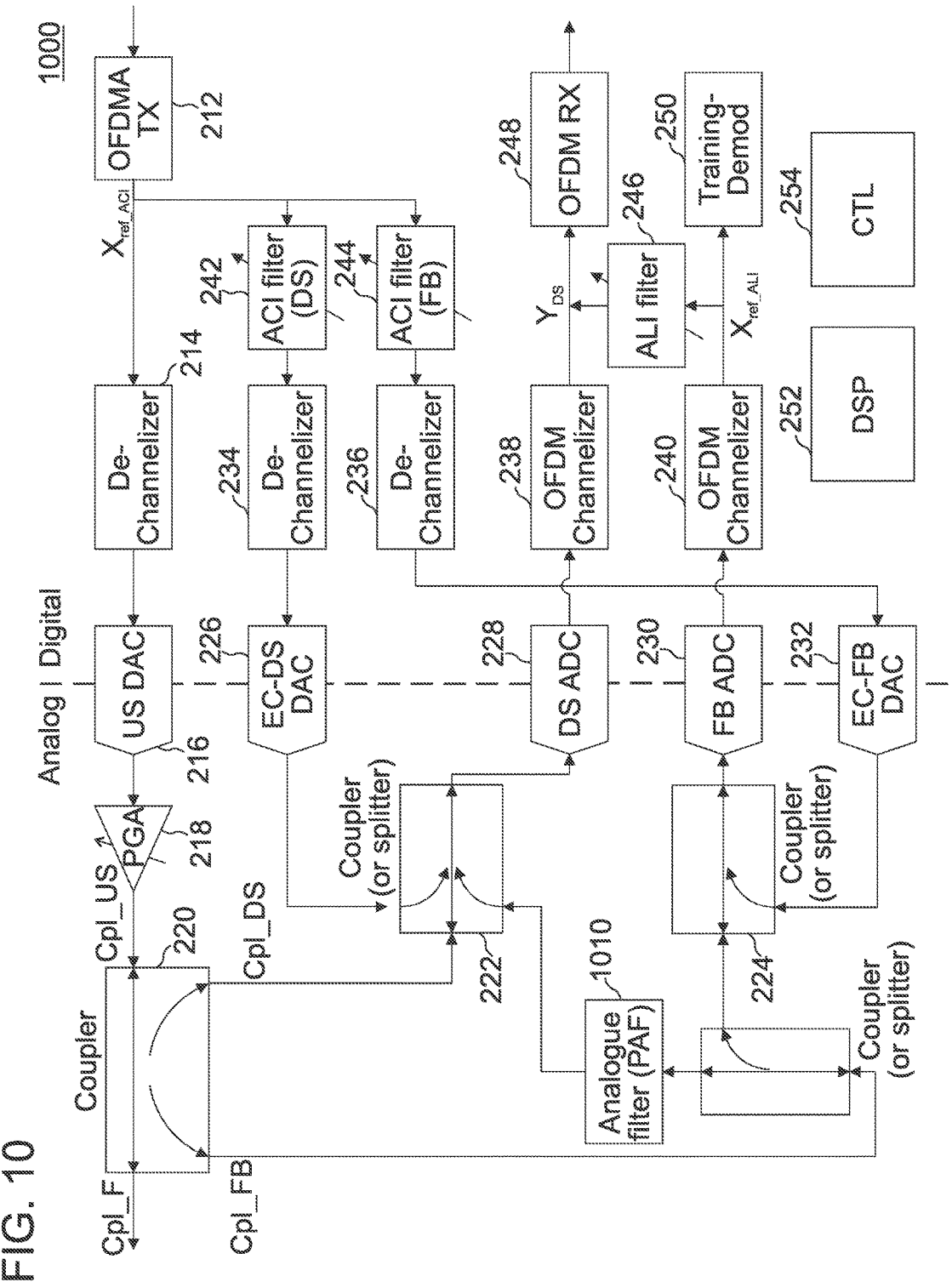
FIGS. 10 and 11 show example architecture of a cable modem having both a combined full-band analog echo canceller and a per-channel echo canceller.

FIG. 10 shows an example architecture of a cable modem 1000 having both a combined full-band analog echo canceller and a per-channel echo canceller. In addition to the analog domain echo cancellation, the cable modem 1000 may also implement the echo cancellation in a digital domain. In this example, an analog domain full-band echo canceller may be added to the cable modem architecture in FIG. 2. In FIG. 10, all echo cancellation elements in FIG. 2 are the same including the components for the digitally constructed analog echo cancellation using the DACs 226, 232 and the digital ALI cancellation using the ADC 230. In addition to the FIG. 2 architecture, an analog filter 1010 (e.g. a PAF) is added for full-band analog echo cancellation in an analog domain.

Even if the analog echo canceller does not provide the required level of echo cancellation (e.g. around 30 dB or more in FDX DOCSIS), the combination of the analog full-band echo canceller together with a digital echo canceller may provide superior modulation error ratio (MER) performance for a cable modem. This is because the analog echo cancellation helps reduce the noise floors in the auxiliary ADC 230 and DACs 226, 232 used in the digital echo cancellation.

Figure 11:
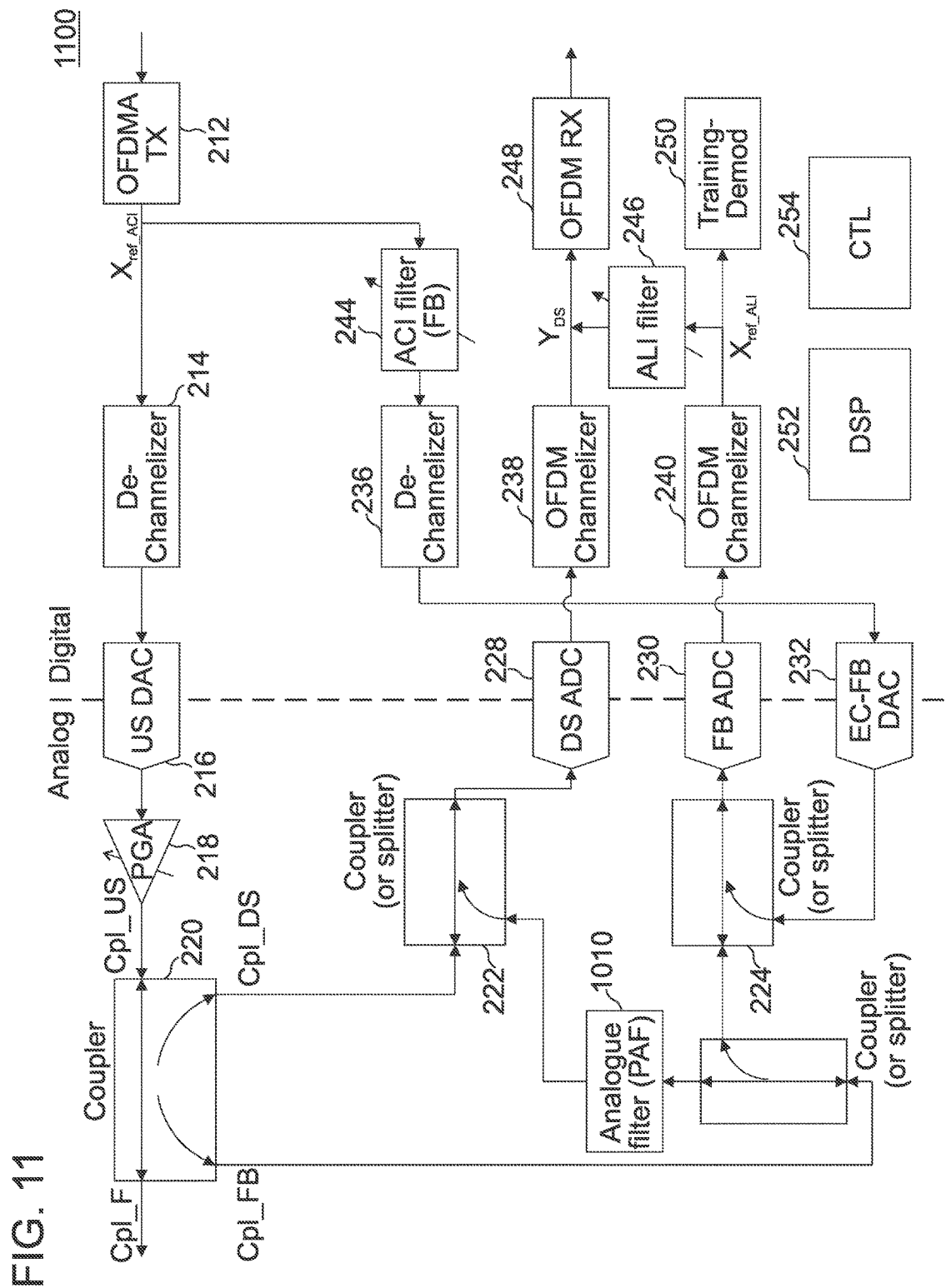

If the analog echo cancellation provides a good performance (e.g. 30 dB or higher ACI cancellation required), some or all of the digital domain echo cancellation elements of the FIG. 2 architecture may be eliminated. FIG. 11 shows an example architecture of a cable modem 1100 with combined full-band analog echo canceller and a per-channel digital ALI echo canceller without the downstream ACI cancellation path (i.e. removing the ACI filter 242, the de-channelizer 234, and the DAC 226 in FIG. 2 or 10).

Alternatively, as stated above, the echo cancellation may be performed in analog domain with the full-band analog echo canceller only without digital domain echo cancellation. For example, the echo cancellation architecture in FIG. 11 may be further simplified by removing the ACI cancellation in the feedback path (i.e. removing the ACI filter 244, the de-channelizer 236, the DAC 232 in FIG. 2 or 10), for example if the analog echo cancellation can give 35 dB or higher cancellation. The feedback path (FB ADC 230) may still be needed for training of the full-band analog echo canceller.

A method for combining the echo channel frequency responses for individual channels to obtain a unified channel response for the entire FDX band (e.g. 3 sub-bands/channels in the current DOCSIS FDX specification) will be explained hereafter. Echo channel estimation is performed for the individual channels (e.g. 3 channels in the FDX band) using the per-channel interference input and output signals (e.g. the per-channel reference signal coming on the feedback path and the per-channel receive signal on the downstream path). The channel estimates for the individual channels can be combined into a single unified channel response because the frequency response for all channels (e.g. 3 channels) are worked out with respect to the same CMTS reference timing. The individual channels may be of different OFDM modes and the symbol timing (i.e. OFDM triggering) may be synchronized differently among channels.

Figure 12:
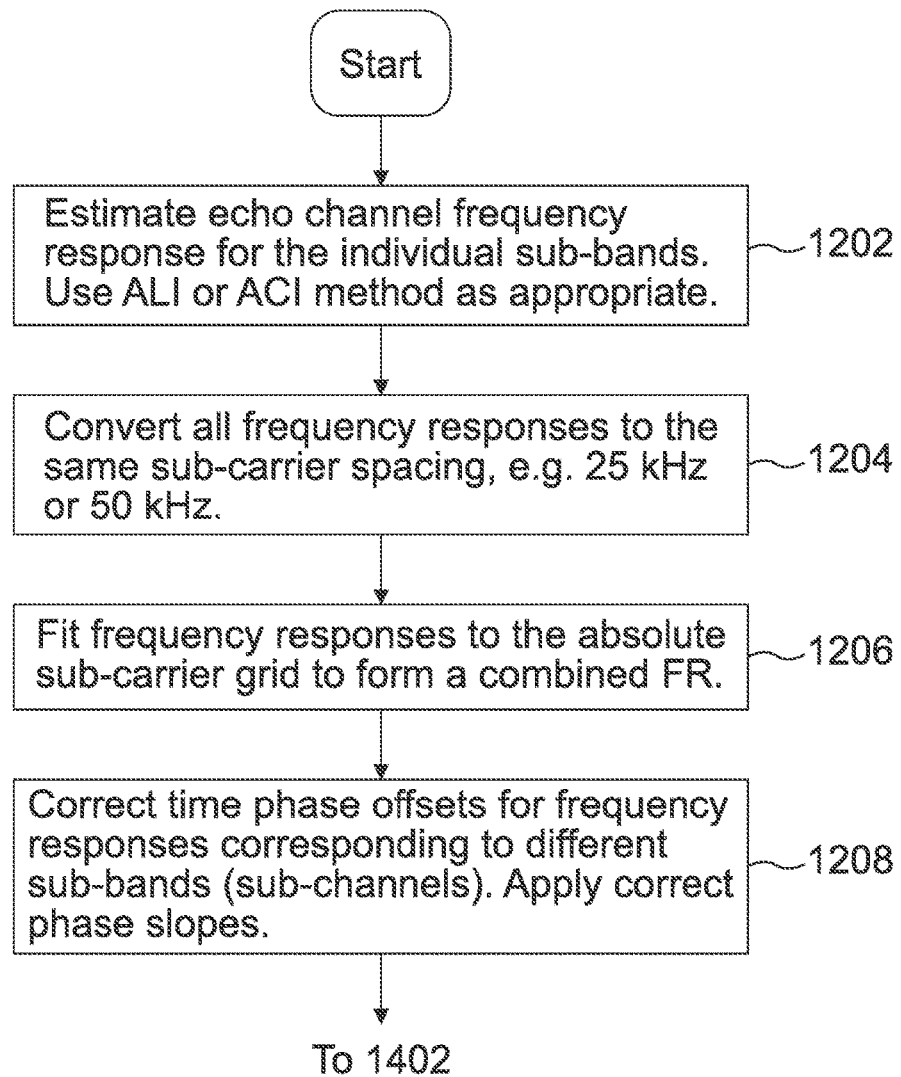
FIG. 12 is a flow diagram of an example process for calculating a combined channel frequency response for the full-band analog echo canceller.

FIG. 12 is a flow diagram of an example process for calculating a combined channel frequency response for the full-band analog echo canceller. An echo channel frequency response is estimated for each individual sub-band of the FDX band (1202). The echo channel frequency response for each sub-band may be calculated using an appropriate echo channel estimation method (e.g. an ALI or ACI method based on the FDX DOCSIS specification). Methods used for channel estimation may be based on whether the channel is currently configured as an upstream channel or a downstream channel.

Referring to FIGS. 10 and 11, the channelizers 238, 240 filter, decimate, and/or resample the full bandwidth captured signal, which is sampled at the CM sample rate, into the individual FDX sub-bands at the CMTS sample timing domain. The outputs of the channelizers 238, 240 generally have the OFDM sample rate (e.g. 204.8 MHz in case of DOCSIS) with respect to the CMTS reference clock (referred to as "CMTS sample timing domain"). Therefore, data at the channelizer output would be in the same sample timing domain (i.e. CMTS sample timing domain) as the upstream digital data per channel at the input to the de-channelizers 214, 234, 236. Therefore, the OFDM sub-carriers at the output of the channelizers 238, 240 and the input to the de-channelizers 214, 234, 236 may be aligned to the CMTS sub-carrier spacing.

Functions of the de-channelizer 214, 234, 236 are reverse of those of the channelizer 238, 240 in that the de-channelizer 214, 234, 236 up-samples and multiplexes individual upstream channels, with appropriate frequency shifts, into a single higher sample rate upstream signal. The de-channelizer 214, 234, 236 also goes through a re-sample phase (sample rate correction) to convert the CMTS sample rate to the CM sample rate to use as input to the DAC 216, 226, 232. The signals at the channelizer output and the de-channelizer input are both in the same CMTS sample domain.

The reference signal (i.e. an interference input to the interference channel) for echo channel estimation in the downstream bands (ALI) may be tapped off from the input to the analog filter 1010 (i.e. the PAF), as a feedback path signal, and converted to digital through the ADC 230 (a feedback ADC). The ALI reference signals are taken from the output of the channelizer 240 in the feedback path for downstream FDX sub-bands. Hence the ALI reference signals are in the CMTS sample time domain. The reference signal for echo channel estimation in the upstream sub-bands (ACI) can either be taken from the feedback path after the channelizer 240, or directly from the upstream digital domain as shown in FIGS. 2, 10, and 11. In either case, the ACI reference signals are also in the CMTS sample timing domain.

The output of the echo interference channel is derived from the output of the ADC 228 in the downstream received data path. Each downstream channel is processed individually after the channelizer 238. Post-channelizer downstream channels are all in the CMTS sample timing domain. Therefore, for both ALI and ACI, both inputs and outputs of the echo channel are in the CMTS sample time domain. For ALI and ACI, the output signals may be processed differently to work out the output of the interference channel. Echo channel estimation for individual channels are performed using the per-channel interference input and output signals (ALI or ACI). In some examples, both ALI and ACI reference signals may be taken from the post-channelized feedback path outputs.

The ALI signal level is likely to be lower than the downstream signal. Therefore, in this case, the downstream signal may be subtracted from the received signal to extract the ALI signal. In accordance with the DOCSIS FDX specification, this may be done using either downstream pilots or ZBL symbols (known sub-carrier modulation) in the downstream. For ACI case, the downstream power level would be lower than the ACI signal. Therefore, the downstream signal may be treated as a low-level noise as far as echo channel estimation for ACI channels is concerned.

Convergence of the echo channel coefficients may be done on a per-channel basis. Any conventional techniques may be used. For example, conventional averaging-based channel estimation or adaptive algorithm, such as normalized least mean square (NLMS), may be used. For averaging-based method, the noisy impulse response (IR) of an echo channel is given by:

$$ec\_channel\_IR=\text{deconv}(output,input).$$

This may be done in a frequency domain as pointwise division of signal frequency responses (FR), taking care of cyclic convolution issues, etc. Ignoring the steps needed to deal with cyclic convolution issues, such as overlap and add methods, a frequency domain channel estimation may be expressed as follows:

$$input\_FR=\text{DFT}\{input\};$$

$$output\_FR=\text{DFT}\{output\};$$

$$ec\_channel\_FR=output\_FR/input\_FR.$$

Once the noisy ec_channel_FR is obtained, it can be averaged over multiple training epochs to get a cleaner channel estimate as follows:

$$ec\_channel\_FR'=E\{ec\_channel\_FR\}.$$

As explained above, the reference signal and the output signals for all FDX channels have the same CMTS OFDM sample rate. This makes the task of combining the echo channel frequency responses (EC_FR) from different channels (e.g. 3 FDX bands/channels) to derive a single higher rate impulse response (IR) simpler.

Referring again to FIG. 12, after obtaining the frequency responses for all sub-bands, the frequency responses may be converted to the same sub-carrier spacing, if needed, (e.g. 25 kHz or 50 kHz) (1204). Before stacking the frequency responses together to generate a combined frequency response, all of the sub-band frequency responses need to be converted to the same frequency resolution. DOCSIS has two OFDM modes with sub-carrier spacing of 25 kHz and 50 kHz for 8K and 4K OFDM sizes, respectively. If all downstream channels are of the same OFDM mode, no conversion is needed. If some downstream channels are 8K and others are 4K, then all frequency channels need to be converted to either 8K resolution (25 kHz) or 4K resolution (50 kHz). To convert 4K resolution to 8K, the frequency response may be oversampled by 2. On the other hand, to convert 8K resolution to 4K, the 8K frequency response may be decimated by 2.

The frequency responses are then fit to the absolute sub-carrier grid to form a combined echo channel frequency response (1206). This can be done mathematically by working out the absolute sub-carrier indices. In DOCSIS, OFDM channels are aligned to a 1 MHz frequency grid with respect to the CMTS reference timing. Since 1 MHz is an integer multiple of both 25 kHz and 50 kHz, if an absolute sub-carrier grid of 25 kHz spacing is defined, all OFDM channels have sub-carriers on this absolute grid. Hence it is possible to stack up all echo channel frequency responses from the sub-channels (e.g. 3 channels) side by side, with appropriate number of 0-valued sub-carriers to represent the band gaps between sub-channels. For example, if the band gap is 2 MHz, 80 (=2 MHz/25 kHz) zeros may be inserted in between the echo channel frequency responses. For 4K mode, 0's may be inserted between two echo channel frequency response values later to be interpolated.

Figure 13:
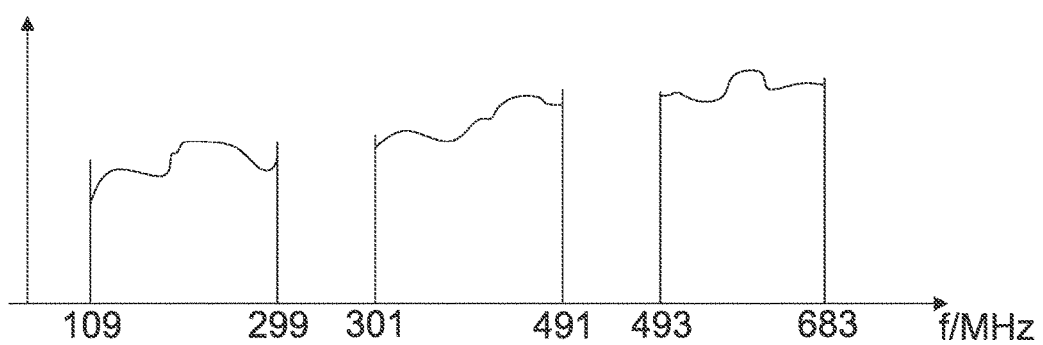
FIG. 13 shows channel estimate for the 3 FDX sub-bands for three 190 MHz channels.

Correction for time phase offsets for frequency responses corresponding to different sub-bands (sub-channels) may be performed (1208). Since all (e.g. 3) echo channel frequency responses are in the CMTS sample timing domain, it may not be needed to correct time or frequency rate offsets. However, it may be needed to correct timing phase offsets due to sample phase and symbol timing offsets. This may be done by applying a phase slope corresponding to a required timing phase offset to a channel frequency response. Applying a phase slope in a frequency domain is equivalent to shifting a channel impulse response in a time domain. Timing phase offset may be estimated or calibrated as part of the echo channel training process. If the reference data for both ALI and ACI from the feedback path is used, there may not be a sample phase offset, provided that the same sample rate correction is used to all sub-bands. This is one way to do timing correction given a DOCSIS cable modem uses a full bandwidth capture. In this case, it may be needed to deal with potentially different trigger points of ALI and ACI training symbol timings and any offsets between the reference and output signals. As described above, a timing phase offset correction can be done by applying a phase slope to the frequency response. For this to be correct, the sub-carriers need to be in the correct absolute sub-carrier grid. Therefore, the frequency responses are stacked up with appropriate number of Os to represent the band gaps as shown in FIG. 13. FIG. 13 shows channel estimate for the 3 FDX sub-bands for three 190 MHz channels.

After stacking the frequency responses together, the timing phase offset for frequency response segments corresponding to each sub-band may be corrected as follows. In absolute sub-carrier grid, as shown in FIG. 13, assume $FR_i$ has subcarrier indices $l_i$ to $r_i$ and has timing phase offset of $t_i$, where i is a sub-band index. It is also assumed that the sub-carrier spacing is $\Delta_f$. Phase slope correction for $FR_i = [H_i(0), H_i(1), \ldots, H_i(r_i-l_i)]$ is given by:

$$FR'_i = [H_i(0)e^{-2j\pi\Delta_f l_i t_i}, H_i(1)e^{-j\pi\Delta_f (l_i+1)t_i}, \ldots, H_i(r_i-l_i)e^{-2j\pi\Delta_f r_i t_i}],$$

for the 3 sub-bands i=1, 2, 3.

With the combined frequency response for the entire FDX band, a channel impulse response (IR) may be estimated to the timing resolution needed for the full band analog echo cancellation. The impulse response may be estimated using an IFFT/IDFT. To make the IFFT implementation more efficient and also to get required time resolution for the impulse response, zero padding may be done to the frequency response to the required bandwidth. Following equation captures timing phase offset correction, band gap insertion, and zero padding steps described above.

$$FR = [H_1(0)e^{-2j\pi\Delta_f 1 t_1}, \ldots, H_1(r_1-l_1)e^{-j\pi\Delta_f r_1 t_1},$$
$$0, \ldots, 0, H_2(0)e^{-2j\pi\Delta_f l_2 t_2}, H_2(r_2-l_2)e^{-2j\pi\Delta_f r_2 t_2},$$
$$0, \ldots, 0, H_3(0)e^{-2j\pi\Delta_f l_3 t_3}, \ldots,$$
$$H_3(r_3-l_3)e^{-2j\pi\Delta_f r_3 t_3}, 0, \ldots 0].$$

In DOCSIS FDX, there are 2 MHz band gaps between the individual channel estimates as shown in FIG. 13. The frequency axis is not drawn to scale in FIG. 13. These band gaps induce discontinuity in a frequency response. This makes the channel impulses disperse in a time domain, which makes the frequency response not sharp. In addition, there are abrupt ends of the frequency response at 109 MHz and 683 MHz, which makes the impulse response even more blurred.

As far as an echo canceller is concerned, the band gaps are don't-care regions. Hence the sharpness of the impulse response may be optimized by assuming any frequency response for these band gaps and beyond the two band edges at 109 MHz and 684 MHz. This may be done as a constrained optimization problem. This may be done by construction using known signal processing principles to improve sharpness, and hence the number of impulses, (i.e. reduce possibility of side lobes appearing as real impulses), of the channel impulse response.

In general, sharpness of the time/frequency domain signal may be improved by windowing (e.g. Hamming, Tukey, etc.) in a frequency/time domain. For example, in a spectrum estimation, a windowed FFT may be used on the time domain to get power spectrum density of a signal which improved sharpness. Windowing has the effect of lowering the side lobes of peaks in the spectrum and hence avoid the risk of identifying side lobes as genuine peaks.

However, in the cases disclosed herein, a window may not be applied straightforwardly to the frequency response because the impulse response to a modified frequency response (by windowing) is not desirable. This impulse response may not be used to program the PAF 912 to cancel the echoes to a high degree of accuracy. In examples, the don't-care regions in the frequency spectrum, (i.e. the 2 MHz band gaps between the channels, a narrow frequency band (e.g. 8 MHz) before 109 MHz, and a frequency range after 683 MHz) may be used to implement a smoothing window for the frequency response.

To do this, first a processing may be done to the frequency response of the echo channel for these small frequency bands and ranges over the edges of the combined frequency response to allow a room for edge tapering without distorting the useful part of the spectrum. For example, the frequency response of the closest channel(s) may be used to interpolate or extrapolate to get the missing responses for sub-carriers in those ranges. However, conventional interpolation techniques may not be used here as the band gaps are too large. In order to interpolate across a bandgap of 2 MHz, the channel impulse response should be confined to a delay spread of ½ MHz=500 ns, but the cable echo channel can be expected to have echoes in the order of 100 µs delay. One example method is described below.

Figure 14:
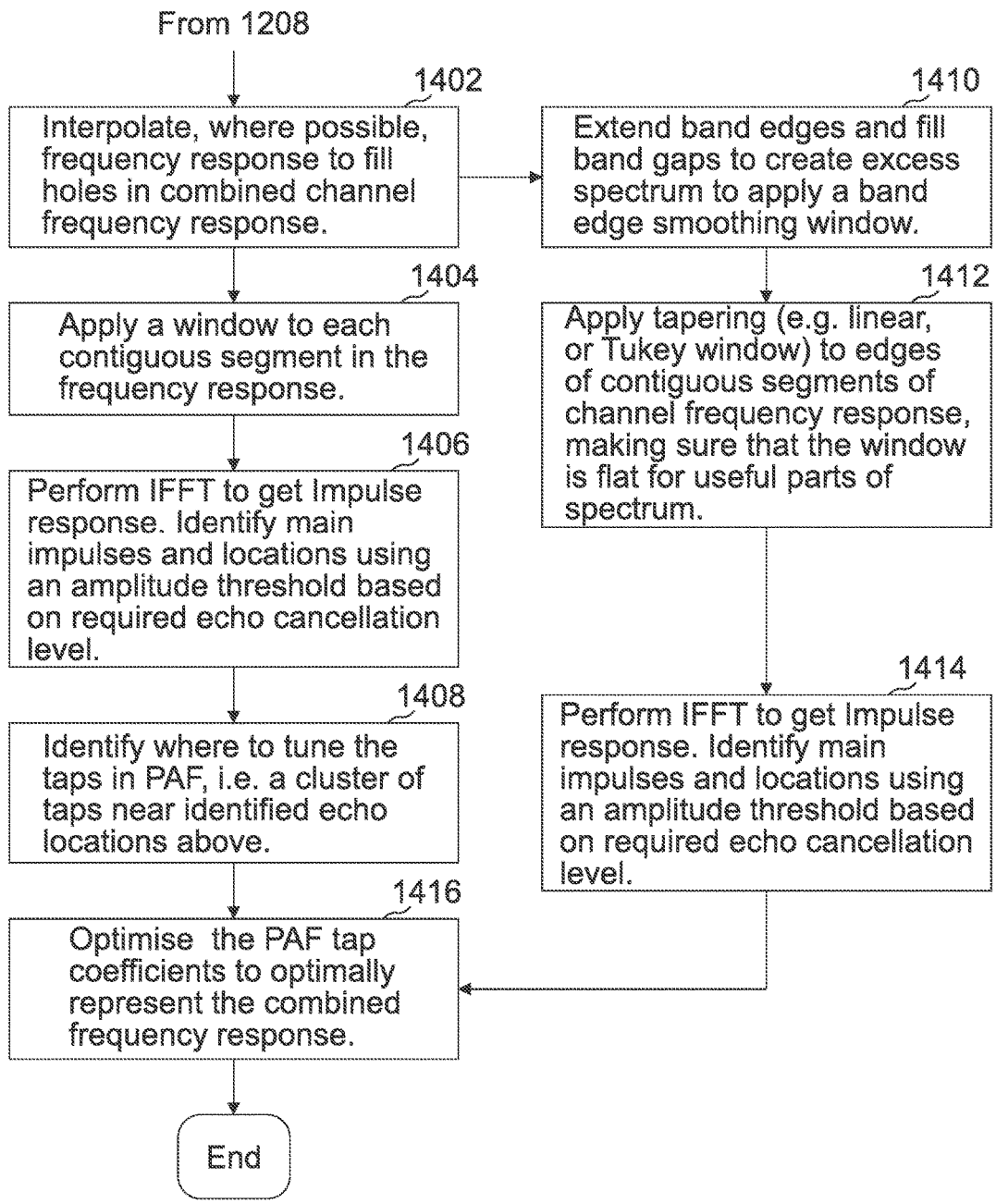
FIG. 14 shows an example process for estimating the echo channel impulse response for the full band analog echo channel training.

FIG. 14 shows an example process for estimating the echo channel impulse response for the full band analog echo channel training. The process may include two branches. The left-hand branch (1402-1408) is to get a high time resolution impulse response of the echo channel for determining the locations and relative amplitudes of discrete echoes. This may not give the correct phases as windowing distorts the frequency response. The right-hand branch (1410-1414) is to get an impulse response which accurately represents useful part of the combined frequency response without distortions.

A combined channel frequency response is obtained as explained above with reference to FIG. 12. Interpolation may be performed to fill the individual or a few sub-carrier exclusion bands (i.e. the gaps in spectrum) in the combined channel frequency response (1402). As explained above, before interpolation, a linear phase slope may be applied to the frequency spectrum (a linear phase slope in a frequency domain shifts the impulse response in a time domain) to center the channel impulse response in a time domain. Slope correction needs to be taken into account (account for the shift in IR) when determining the impulse locations in the impulse response following IFFT. This interpolation may not fill large bandgaps, such as the inter-channel band gaps.

Figure 15:
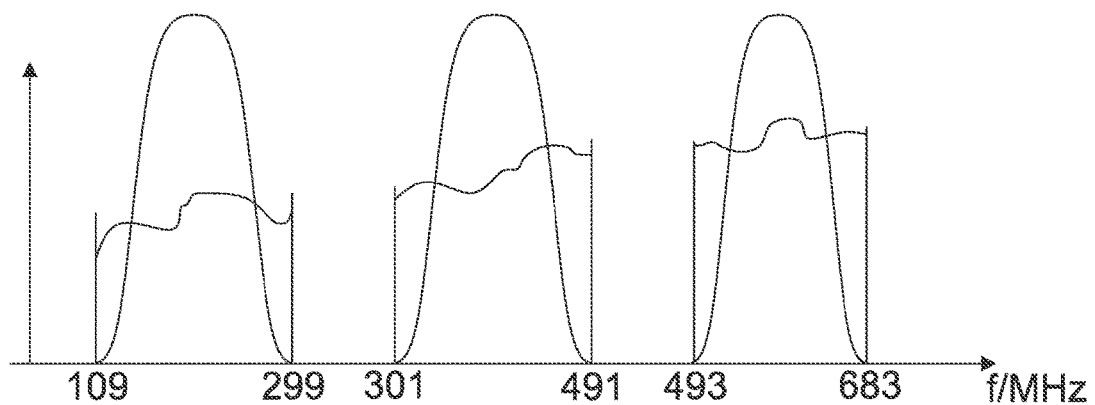
FIG. 15 illustrates an example of applying a window to each contiguous segment in the frequency response prior to inverse fast Fourier transform (IFFT) operation to estimate impulse locations.

A window (e.g. a hamming window, etc.) may be applied to each contiguous segment in the frequency response. Contiguous segments are defined as frequency response regions bounded by exclusion regions after interpolation (1404). FIG. 15 illustrates an example of applying a window (e.g. a Hamming window) to each contiguous segment in the frequency response prior to IFFT operation to estimate impulse locations.

An IFFT may be performed after applying the window to get an impulse response, and main impulses and locations are then identified using an amplitude threshold (1406). The amplitude threshold may be determined based on the required echo cancellation level.

Where to tune the taps in the PAF 912 is then identified, i.e. a cluster of taps near the identified echo locations (1408). Intra-cluster tap spacing <1/(2×BW_combined). Information needed to calculate the coefficients for programming the PAF 912 is the impulse response (IR) of the echo channel. To make the delay line simpler, the number of taps in the PAF 912 may be limited. The energy of the channel impulses may be localized to a time as narrow as possible, allowing identification of the locations of delays in the echo channel as accurately as possible. This helps with identifying where it is needed to tune the taps in the PAF 912. Given that the PAF 912 cannot precisely place taps in exact time points of delay, a cluster of delays may be placed around the actual delay locations. Provided that the PAF 912 places the delays in a cluster with a delay with time spacing close enough (e.g. better than the Nyquist sample time taking into account a full bandwidth of the FDX band, including all the channels) the interference channel can be interpolated accurately. The number of taps needed for a cluster depends on how accurately the echo channel impulses can be located.

In the right-hand branch, the band edges may be extended and band gaps between sub-bands may be filled to create an excess spectrum to apply a band edge smoothing window (1410). The edge extension may involve repeating edge samples to create a region of spectrum for tapering.

Tapering (e.g. linear tapering or Tukey window) may be then applied to the edge-extended continuous segments of the channel frequency response (1412). The window applied for tapering should be flat for the useful parts of the spectrum so that the original frequency response is not distorted by the window, rather the window smooths it using the band gaps and the spectrum outside the band edges.

Extending the contiguous band edges may involve applying a linear phase slope to the extended part of the spectrum. Linear slope may be optimized to best represent the echo channel. For example, if the echo channel has one dominant echo at delay τ, which will be evident from the impulse response obtained from the left-hand branch in FIG. 14, the extended subcarrier may be modulated to apply a matching group delay of τ as explained below.

For right edge extension by M sub-carriers to apply a tapering of M sub-carriers, the frequency response for the edge sub-carrier is H(n), and (n+1) to (n+M) subcarriers are zero valued (band gap or beyond band edge). The edge extension may be defined as follows:

Edge extension=$[H(n)e^{-j2\pi\Delta_f\tau}, H(n)e^{-j2\pi 2\Delta_f\tau}, \ldots, H(n)e^{-j2\pi M\Delta_f\tau}]$, where $\Delta_f$ is the sub-carrier spacing. The frequency response for subcarrier(n+1) to subcarrier(n+M) are then replaced with the above edge extension.

For left edge extension by M sub-carriers, the frequency response for the edge sub-carrier is H(m), and (m−M) to (m−1) subcarriers are zero valued (band gap or beyond band edge). The edge extension may be defined as follows:

Edge extension=$[H(m)e^{j2\pi M\Delta_f\tau}, H(m)e^{-j2\pi (M-1)\Delta_f\tau}, \ldots, H(n)e^{j2\pi\Delta_f\tau}]$, The frequency response for subcarrier(m−M) to subcarrier(m−1) are then replaced with the above edge extension.

Even when there is no dominant peak in the echo channel impulse response, an optimal slope value may be generated to apply to the edge extensions, for example, based on a weighted mean echo delay, $$\tau_{opt} = \frac{\sum \tau_i P_i}{\sum P_i},$$

where $\tau_i$ and $P_i$ are the delay and power of the $i^{th}$ echo, and the summation is done over all significant echoes. The summation may be limited to over discrete echoes only, excluding structural return loss echoes (small echoes). This may be implemented as an optimization option.

Figure 16:
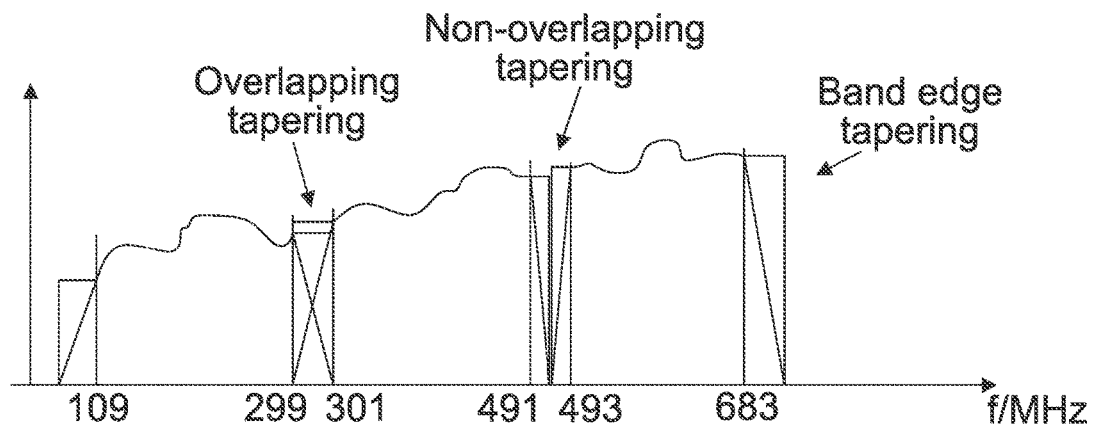
FIG. 16 shows an example of edge extension and linear tapering of the channel frequency response.

FIG. 16 shows an example of edge extension and linear tapering of the channel frequency response. The amplitudes in the edge extension region may be set as the same as the nearest edge sub-carrier, but the phase may be linearly modulated as described above. In the above example, the edges of the 3 contiguous segments are extended and the extensions are tapered to get a smooth spectrum without any edges. Edge extension may be of different width depending on the band gap. In a band gap, the left and right edge extensions may overlap and be added. Alternatively, in a band gap, the left and right edge extensions may not overlap.

FIG. 16 shows both examples of overlapping extension and tapering in the 299-301 MHz band gap and non-overlapping extension and tapering in the 491-493 MHz band gap. Taping should not affect non-zero values in the original frequency response. Hence the impulse response obtained from the tapered channel response represents a useful portion of the frequency response without any distortions.

In the above algorithm, IFFT may be done on the zero-padded equivalent 204.8×3 spectrum. This is 8192×3 or 4096×3 IFFT for 8K or 4K modes, respectively. The frequency response may be decimated to reduce the FFT size as this does not affect the time resolution. If the channel response is limited to 1 µs, the frequency response may be decimated by a factor of 40 and 20 in 8K and 4K modes, respectively. Decimation by a factor of 24 and 12 will give an IFFT length of 1024 for both OFDM modes. This may be enough to resolve delays up to 1.67 µs.

Referring again to FIG. 14, an IFFT is performed on the frequency response after tapering to get an impulse response (1414). Main impulses and locations may be identified in the impulse response using an amplitude threshold. The amplitude threshold may be determined based on a required echo cancellation level.

As an alternative example, the left-hand branch in FIG. 14 may be removed and the right-hand branch in FIG. 14 may be used to get the location of the echoes. However, the left-hand branch can be expected to give sharper peaks at echo locations as it would be able to apply the frequency domain window without the constraint of not-disturbing the useful part of the spectrum. Besides, the impulse response location data obtained from the left branch may be needed to work out the modulation that needs to apply to the edge extensions in the right branch.

Once the impulse locations are identified (from the left or right branch in FIG. 14), and the channel impulse response is obtained from the right branch, the PAF tap coefficients are then optimized to optimally represent the combined frequency response (1416).

Another example is a computer program having a program code for performing at least one of the methods described herein, when the computer program is executed on a computer, a processor, or a programmable hardware component. Another example is a machine-readable storage including machine readable instructions, when executed, to implement a method or realize an apparatus as described herein. A further example is a machine-readable medium including code, when executed, to cause a machine to perform any of the methods described herein.

The examples as described herein may be summarized as follows:

Example 1 is a cable modem configured to cancel self-interference caused by an upstream signal transmitted by the cable modem from a downstream signal received by the cable modem. The cable modem comprises a processor configured to obtain a frequency response of an echo channel for at least one sub-channel in an FDX band and calculate filter coefficients based on the frequency response, and an interference canceller configured to cancel the self-interference in the downstream signal, wherein the interference canceller includes at least one filter in a digital domain configured to generate an interference cancellation signal from a reference signal using the filter coefficients to cancel the self-interference.

Example 2 is the cable modem of example 1, wherein the interference canceller includes a first filter configured to generate a first interference cancellation signal from an upstream reference signal in a digital domain, a first de-channelizer configured to up-sample the first interference cancellation signal into a higher rate upstream signal, a first digital-to-analog converter configured to convert the higher rate upstream signal to an analog signal, and a first coupler configured to couple the analog signal with the downstream signal to cancel the self-interference in an analog domain.

Example 3 is the cable modem as in any one of examples 1-2, wherein the interference canceller includes an analog-to-digital converter configured to convert a feedback signal obtained by tapping a transmitted upstream analog signal to a digital version of the feedback signal, a channelizer configured to extract a specific frequency band of signal from the digital version of the feedback signal, and a second filter configured to generate a second interference cancellation signal from a reference signal taken from an output of the channelizer, wherein an interference due to an out-of-band leakage of the upstream signal is cancelled by subtracting the second interference cancellation signal from the downstream signal in a digital domain.

Example 4 is the cable modem of example 3, wherein the interference canceller includes a third filter configured to generate a third interference cancellation signal from the upstream reference signal in a digital domain, a second de-channelizer configured to up-sample the third interference cancellation signal into a second higher rate upstream signal, a second digital-to-analog converter configured to convert the second higher rate upstream signal to a second analog signal, and a second coupler configured to couple the second analog signal with the feedback signal in an analog domain.

Example 5 is the cable modem as in any one of examples 1-4, wherein the processor is configured to filter the frequency response of the echo channel in a frequency domain to limit a corresponding time domain channel response to a predetermined length.

Example 6 is the cable modem as in any one of examples 1-5, wherein the processor is configured to convert the frequency response of the echo channel to a time domain channel response, apply a window to the time domain channel response, and convert the windowed time domain channel response back to a frequency domain.

Example 7 is the cable modem as in any one of examples 1-6, wherein the channel response is obtained by transmitting a training signal and the training signal is not aligned to a downstream OFDM symbol, and the processor is configured to apply a gain correction to a time domain channel response to reduce an error incurred from misalignment of OFDM symbols in upstream and downstream.

Example 8 is the cable modem as in any one of examples 1-7, wherein the processor is further configured to obtain frequency responses of an echo channel for all sub-channels in the FDX band, combine the frequency responses into a combined frequency response, and generate a channel impulse response for the FDX band from the combined frequency response, and the interference canceller is configured to cancel the self-interference in the downstream signal in an analog domain based on the channel impulse response.

Example 9 is a cable modem configured to cancel self-interference caused by an upstream signal transmitted by the cable modem from a downstream signal received by the cable modem. The cable modem comprises a processor configured to obtain frequency responses of an echo channel for all sub-channels in an FDX band, combine the frequency responses into a combined frequency response for the FDX band, and generate a channel impulse response for the FDX band from the combined frequency response, and an interference canceller configured to cancel the self-interference in the downstream signal in an analog domain based on the channel impulse response.

Example 10 is the cable modem of example 9, wherein the processor is configured to convert all of the frequency responses to a same sub-carrier spacing, and correct time phase offsets of the frequency responses corresponding to different sub-channels by applying phase slopes.

Example 11 is the cable modem as in any one of examples 9-10, wherein the processor is configured to perform interpolation to fill a gap in the combined frequency response and apply a window to each contiguous segment in the combined frequency response.

Example 12 is the cable modem of example 11, wherein the processor is configured to perform inverse fast Fourier transform on the combined frequency response to obtain the channel impulse response, identify locations of main impulses in the channel impulse response using an amplitude threshold, and identify taps in a programmable analog filter in the interference canceller based on the locations of the main impulses.

Example 13 is the cable modem of example 12, wherein the processor is configured to place a cluster of taps near the identified locations of the main impulses.

Example 14 is the cable modem as in any one of examples 11-13, wherein the processor is configured to extend band edges and fill band gaps in the combined frequency response to create an excess spectrum, modulate an extended part of spectrum to apply a group delay equivalent to weighted mean echo delay of the channel impulse response, apply a band edge smoothing window to the excess spectrum, and perform inverse fast Fourier transform to get the channel impulse response.

Example 15 is the cable modem of example 14, wherein the processor is configured to identify locations of main impulses in the channel impulse response using an amplitude threshold and identify taps in a programmable analog filter in the interference canceller based on the locations of the main impulses.

Example 16 is a method for canceling self-interference caused by an upstream signal transmitted by a cable modem from a downstream signal received by the cable modem. The method comprises obtaining a frequency response of an echo channel for at least one sub-channel in an FDX band in a digital domain, calculating filter coefficients based on the frequency response, generating an interference cancellation signal from a reference signal in a digital domain using the filter coefficients, and canceling the self-interference in the downstream signal by subtracting the interference cancellation signal from the downstream signal.

Example 17 is the method of example 16, further comprising generating a first interference cancellation signal from an upstream reference signal in a digital domain, up-sampling the first interference cancellation signal into a higher rate upstream signal, converting the higher rate upstream signal to an analog signal, and coupling the analog signal with the downstream signal to cancel the self-interference in an analog domain.

Example 18 is the method as in any one of examples 16-17, further comprising obtaining a feedback signal by tapping a transmitted upstream analog signal, converting the feedback signal to a digital version of the feedback signal, extracting a specific frequency band of signal from the digital version of the feedback signal with a channelizer, and generating a second interference cancellation signal from a reference signal taken from an output of the channelizer, wherein an interference due to an out-of-band leakage of the upstream signal is cancelled by subtracting the second interference cancellation signal from the downstream signal in a digital domain.

Example 19 is the method of example 18, further comprising generating a third interference cancellation signal from the upstream reference signal in a digital domain, up-sampling the third interference cancellation signal into a second higher rate upstream signal, converting the second higher rate upstream signal to a second analog signal, and coupling the second analog signal with the feedback signal in an analog domain.

Example 20 is the method as in any one of examples 16-19, wherein the channel response is obtained by transmitting a training signal and the training signal is not aligned to a downstream OFDM symbol, and a gain correction is applied to a time domain channel response to reduce an error incurred from misalignment of OFDM symbols in upstream and downstream.

Example 21 is a method for canceling self-interference caused by an upstream signal transmitted by a cable modem from a downstream signal received by the cable modem. The method comprises obtaining frequency responses of an echo channel for all sub-channels in an FDX band, combining the frequency responses into a combined frequency response for the FDX band, generating a channel impulse response for the FDX band from the combined frequency response, and canceling the self-interference in the downstream signal in an analog domain based on the channel impulse response.

Example 22 is the method of example 21, further comprising performing interpolation to fill a gap in the combined frequency response and applying a window to each contiguous segment in the combined frequency response.

Example 23 is the method of example 22, further comprising performing inverse fast Fourier transform on the combined frequency response to obtain the channel impulse response, identifying locations of main impulses in the channel impulse response using an amplitude threshold, and identifying taps in a programmable analog filter in an interference canceller based on the locations of the main impulses.

Example 24 is the method of example 23, wherein a cluster of taps are placed near the identified locations of the main impulses.

Example 25 is the method as in any one of examples 21-24, further comprising extending band edges and filling band gaps in the combined frequency response to create an excess spectrum, applying a phase slope to the excess spectrum to introduce a group delay equivalent to weighted mean echo delay of the channel impulse response, applying a band edge smoothing window to the excess spectrum, and performing inverse fast Fourier transform to get the channel impulse response.

Example 26 is an apparatus configured to cancel self-interference caused by an upstream signal transmitted by the cable modem from a downstream signal received by the cable modem. The apparatus comprises a processing means configured to obtain a frequency response of an echo channel for at least one sub-channel in an FDX band and calculate filter coefficients based on the frequency response, and a canceling means configured to cancel the self-interference in the downstream signal, wherein the canceling means includes at least one filter in a digital domain configured to generate an interference cancellation signal from a reference signal using the filter coefficients to cancel the self-interference.

Example 27 is the apparatus of example 26, wherein the canceling means includes a first filter configured to generate a first interference cancellation signal from an upstream reference signal in a digital domain, a first de-channelizer configured to up-sample the first interference cancellation signal into a higher rate upstream signal, a first digital-to-analog converter configured to convert the higher rate upstream signal to an analog signal, and a first coupler configured to couple the analog signal with the downstream signal to cancel the self-interference in an analog domain.

Example 28 is the apparatus as in any one of examples 26-27, wherein the canceling means includes an analog-to-digital converter configured to convert a feedback signal obtained by tapping a transmitted upstream analog signal to a digital version of the feedback signal, a channelizer configured to extract a specific frequency band of signal from the digital version of the feedback signal, and a second filter configured to generate a second interference cancellation signal from a reference signal taken from an output of the channelizer, wherein an interference due to an out-of-band leakage of the upstream signal is cancelled by subtracting the second interference cancellation signal from the downstream signal in a digital domain.

Example 29 is the apparatus of example 28, wherein the canceling means includes a third filter configured to generate a third interference cancellation signal from the upstream reference signal in a digital domain, a second de-channelizer configured to up-sample the third interference cancellation signal into a second higher rate upstream signal, a second digital-to-analog converter configured to convert the second higher rate upstream signal to a second analog signal, and a second coupler configured to couple the second analog signal with the feedback signal in an analog domain.

Example 30 is the apparatus as in any one of examples 26-29, wherein the processing means is configured to filter the frequency response of the echo channel in a frequency domain to limit a corresponding time domain channel response to a predetermined length.

Example 31 is the apparatus as in any one of examples 26-30, wherein the processing means is configured to convert the frequency response of the echo channel to a time domain channel response, apply a window to the time domain channel response, and convert the windowed time domain channel response back to a frequency domain.

Example 32 is the apparatus as in any one of examples 26-31, wherein the channel response is obtained by transmitting a training signal and the training signal is not aligned to a downstream OFDM symbol, and the processor is configured to apply a gain correction to a time domain channel response to reduce an error incurred from misalignment of OFDM symbols in upstream and downstream.

Example 33 is the apparatus as in any one of examples 26-32, wherein the processing means is further configured to obtain frequency responses of an echo channel for all sub-channels in the FDX band, combine the frequency responses into a combined frequency response, and generate a channel impulse response for the FDX band from the combined frequency response, and the interference canceller is configured to cancel the self-interference in the downstream signal in an analog domain based on the channel impulse response.

Example 34 is an apparatus configured to cancel self-interference caused by an upstream signal transmitted by the cable modem from a downstream signal received by the cable modem. The apparatus comprises a processing means configured to obtain frequency responses of an echo channel for all sub-channels in an FDX band, combine the frequency responses into a combined frequency response for the FDX band, and generate a channel impulse response for the FDX band from the combined frequency response, and a canceling means configured to cancel the self-interference in the downstream signal in an analog domain based on the channel impulse response.

Example 35 is the apparatus of example 34, wherein the processing means is configured to convert all of the frequency responses to a same sub-carrier spacing, and correct time phase offsets of the frequency responses corresponding to different sub-channels by applying phase slopes.

Example 36 is the apparatus as in any one of examples 34-35, wherein the processing means is configured to perform interpolation to fill a gap in the combined frequency response and apply a window to each contiguous segment in the combined frequency response.

Example 37 is the apparatus of example 36, wherein the processing means is configured to perform inverse fast Fourier transform on the combined frequency response to obtain the channel impulse response, identify locations of main impulses in the channel impulse response using an amplitude threshold, and identify taps in a programmable analog filter in the interference canceller based on the locations of the main impulses.

Example 38 is the apparatus of example 37, wherein the processing means is configured to place a cluster of taps near the identified locations of the main impulses.

Example 39 is the apparatus as in any one of examples 36-38, wherein the processing means is configured to extend band edges and fill band gaps in the combined frequency response to create an excess spectrum, modulate an extended part of spectrum to apply a group delay equivalent to weighted mean echo delay of the channel impulse response, apply a band edge smoothing window to the excess spectrum, and perform inverse fast Fourier transform to get the channel impulse response.

Example 40 is the apparatus of example 39, wherein the processing means is configured to identify locations of main impulses in the channel impulse response using an amplitude threshold and identify taps in a programmable analog filter in the interference canceller based on the locations of the main impulses.

Example 41 is a non-transitory machine-readable storage including machine readable instructions, when executed, to implement a method or realize an apparatus as in any one of examples 1-40.

Example 42 is a computer program having a program code for performing a method as in any one of examples above, when the computer program is executed on a computer, a processor, or a programmable hardware component.

Example 43 is a machine-readable medium including code, when executed, to cause a machine to perform a method as in any one of examples above.

The aspects and features mentioned and described together with one or more of the previously detailed examples and figures, may as well be combined with one or more of the other examples in order to replace a like feature of the other example or in order to additionally introduce the feature to the other example.

Examples may further be or relate to a computer program having a program code for performing one or more of the above methods, when the computer program is executed on a computer or processor. Steps, operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. Furthermore, all examples recited herein are principally intended expressly to be only for pedagogical purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A functional block denoted as "means for . . . " performing a certain function may refer to a circuit that is configured to perform a certain function. Hence, a "means for s.th." may be implemented as a "means configured to or suited for s.th.", such as a device or a circuit configured to or suited for the respective task.

Functions of various elements shown in the figures, including any functional blocks labeled as "means", "means for providing a sensor signal", "means for generating a transmit signal.", etc., may be implemented in the form of dedicated hardware, such as "a signal provider", "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software, but may include digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

What is claimed is:

1. A cable modem configured to cancel self-interference caused by an upstream signal transmitted by the cable modem from a downstream signal received by the cable modem, the cable modem comprising:
    a processor configured to obtain a frequency response of an echo channel for at least one sub-channel in a full duplex (FDX) band and calculate filter coefficients based on the frequency response; and
    an interference canceller configured to cancel the self-interference in the downstream signal, wherein the interference canceller includes at least one filter in a digital domain configured to generate an interference cancellation signal from a reference signal using the filter coefficients to cancel the self-interference,
    wherein the interference canceller includes:
    a first filter configured to generate a first interference cancellation signal from an upstream reference signal in a digital domain;
    a first de-channelizer configured to up-sample the first interference cancellation signal into a higher rate upstream signal;
    a first digital-to-analog converter configured to convert the higher rate upstream signal to an analog signal; and
    a first coupler configured to couple the analog signal with the downstream signal to cancel the self-interference in an analog domain.

2. The cable modem of claim 1, wherein the interference canceller includes:
    an analog-to-digital converter configured to convert a feedback signal obtained by tapping a transmitted upstream analog signal to a digital version of the feedback signal;
    a channelizer configured to extract a specific frequency band of signal from the digital version of the feedback signal; and
    a second filter configured to generate a second interference cancellation signal from a reference signal taken from an output of the channelizer,
    wherein an interference due to an out-of-band leakage of the upstream signal is cancelled by subtracting the second interference cancellation signal from the downstream signal in a digital domain.

3. The cable modem of claim 2, wherein the interference canceller includes:
    a third filter configured to generate a third interference cancellation signal from the upstream reference signal in a digital domain;
    a second de-channelizer configured to up-sample the third interference cancellation signal into a second higher rate upstream signal;

a second digital-to-analog converter configured to convert the second higher rate upstream signal to a second analog signal; and a second coupler configured to couple the second analog signal with the feedback signal in an analog domain.

4. The cable modem of claim 1, wherein the processor is configured to filter the frequency response of the echo channel in a frequency domain to limit a corresponding time domain channel response to a predetermined length.

5. The cable modem of claim 1, wherein the processor is configured to convert the frequency response of the echo channel to a time domain channel response, apply a window to the time domain channel response, and convert the windowed time domain channel response back to a frequency domain.

6. The cable modem of claim 1, wherein the channel response is obtained by transmitting a training signal and the training signal is not aligned to a downstream orthogonal frequency division multiplex (OFDM) symbol, and the processor is configured to apply a gain correction to a time domain channel response to reduce an error incurred from misalignment of OFDM symbols in upstream and downstream.

7. The cable modem of claim 1, wherein the processor is further configured to obtain frequency responses of an echo channel for all sub-channels in the FDX band, combine the frequency responses into a combined frequency response, and generate a channel impulse response for the FDX band from the combined frequency response, and the interference canceller is configured to cancel the self-interference in the downstream signal in an analog domain based on the channel impulse response.

8. A cable modem configured to cancel self-interference caused by an upstream signal transmitted by the cable modem from a downstream signal received by the cable modem, the cable modem comprising:

a processor configured to obtain frequency responses of an echo channel for all sub-channels in a full duplex (FDX) band, combine the frequency responses into a combined frequency response for the FDX band, and generate a channel impulse response for the FDX band from the combined frequency response; and an interference canceller configured to cancel the self-interference in the downstream signal in an analog domain based on the channel impulse response.

9. The cable modem of claim 8, wherein the processor is configured to convert all of the frequency responses to a same sub-carrier spacing, and correct time phase offsets of the frequency responses corresponding to different sub-channels by applying phase slopes.

10. The cable modem of claim 8, wherein the processor is configured to perform interpolation to fill a gap in the combined frequency response and apply a window to each contiguous segment in the combined frequency response.

11. The cable modem of claim 10, wherein the processor is configured to perform inverse fast Fourier transform on the combined frequency response to obtain the channel impulse response, identify locations of main impulses in the channel impulse response using an amplitude threshold, and identify taps in a programmable analog filter in the interference canceller based on the locations of the main impulses.

12. The cable modem of claim 11, wherein the processor is configured to place a cluster of taps near the identified locations of the main impulses.

13. The cable modem of claim 10, wherein the processor is configured to extend band edges and fill band gaps in the combined frequency response to create an excess spectrum, modulate an extended part of spectrum to apply a group delay equivalent to weighted mean echo delay of the channel impulse response, apply a band edge smoothing window to the excess spectrum, and perform inverse fast Fourier transform to get the channel impulse response.

14. The cable modem of claim 13, wherein the processor is configured to identify locations of main impulses in the channel impulse response using an amplitude threshold and identify taps in a programmable analog filter in the interference canceller based on the locations of the main impulses.

15. A method for canceling self-interference caused by an upstream signal transmitted by a cable modem from a downstream signal received by the cable modem, the method comprising:

obtaining a frequency response of an echo channel for at least one sub-channel in a full duplex (FDX) band in a digital domain;

calculating filter coefficients based on the frequency response;

generating an interference cancellation signal from a reference signal in a digital domain using the filter coefficients; and canceling the self-interference in the downstream signal by subtracting the interference cancellation signal from the downstream signal, wherein the method further comprises:

generating a first interference cancellation signal from an upstream reference signal in a digital domain;

up-sampling the first interference cancellation signal into a higher rate upstream signal;

converting the higher rate upstream signal to an analog signal; and coupling the analog signal with the downstream signal to cancel the self-interference in an analog domain.

16. The method of claim 15, further comprising:

obtaining a feedback signal by tapping a transmitted upstream analog signal;

converting the feedback signal to a digital version of the feedback signal;

extracting a specific frequency band of signal from the digital version of the feedback signal with a channelizer; and generating a second interference cancellation signal from a reference signal taken from an output of the channelizer, wherein an interference due to an out-of-band leakage of the upstream signal is cancelled by subtracting the second interference cancellation signal from the downstream signal in a digital domain.

17. The method of claim 16, further comprising:

generating a third interference cancellation signal from the upstream reference signal in a digital domain;

up-sampling the third interference cancellation signal into a second higher rate upstream signal;

converting the second higher rate upstream signal to a second analog signal; and coupling the second analog signal with the feedback signal in an analog domain.

18. The method of claim 15, wherein the channel response is obtained by transmitting a training signal and the training signal is not aligned to a downstream orthogonal frequency division multiplex (OFDM) symbol, and a gain correction is applied to a time domain channel response to reduce an error incurred from misalignment of OFDM symbols in upstream and downstream.

19. A method for canceling self-interference caused by an upstream signal transmitted by a cable modem from a downstream signal received by the cable modem, the method comprising:
obtaining frequency responses of an echo channel for all sub-channels in a full duplex (FDX) band;
combining the frequency responses into a combined frequency response for the FDX band;
generating a channel impulse response for the FDX band from the combined frequency response; and
canceling the self-interference in the downstream signal in an analog domain based on the channel impulse response.

20. The method of claim 19, further comprising:
performing interpolation to fill a gap in the combined frequency response; and
applying a window to each contiguous segment in the combined frequency response.

21. The method of claim 20, further comprising:
performing inverse fast Fourier transform on the combined frequency response to obtain the channel impulse response;
identifying locations of main impulses in the channel impulse response using an amplitude threshold; and
identifying taps in a programmable analog filter in an interference canceller based on the locations of the main impulses.

22. The method of claim 21, wherein a cluster of taps are placed near the identified locations of the main impulses.

23. The method of claim 19, further comprising:
extending band edges and filling band gaps in the combined frequency response to create an excess spectrum;
applying a phase slope to the excess spectrum to introduce a group delay equivalent to weighted mean echo delay of the channel impulse response;
applying a band edge smoothing window to the excess spectrum; and
performing inverse fast Fourier transform to get the channel impulse response.

* * * * *